(12) United States Patent
Ma et al.

(10) Patent No.: US 12,119,649 B2
(45) Date of Patent: Oct. 15, 2024

(54) OSCILLATION ACTIVE DAMPING CONTROL METHOD AND SYSTEM FOR GRID-TIED TYPE-4 WIND TURBINE GENERATOR

(71) Applicant: NORTH CHINA ELECTRIC POWER UNIVERSITY, Beijing (CN)

(72) Inventors: Jing Ma, Beijing (CN); Letian Wang, Beijing (CN); Xiangyu Li, Beijing (CN); Wangyang Du, Beijing (CN); Yitong Xu, Beijing (CN)

(73) Assignee: NORTH CHINA ELECTRIC POWER UNIVERSITY, Bejing (CN)

( * ) Notice: Subject to any disclaimer, the term of this patent is extended or adjusted under 35 U.S.C. 154(b) by 387 days.

(21) Appl. No.: 17/828,696

(22) Filed: May 31, 2022

(65) Prior Publication Data
US 2022/0399719 A1 Dec. 15, 2022

(30) Foreign Application Priority Data
Jun. 2, 2021 (CN) .......................... 202110616024.X

(51) Int. Cl.
| | | |
|---|---|---|
| *H02J 3/02* | (2006.01) | |
| *G05B 19/042* | (2006.01) | |
| *H02J 3/24* | (2006.01) | |
| *H02J 3/38* | (2006.01) | |

(52) U.S. Cl.
CPC ............ *H02J 3/241* (2020.01); *G05B 19/042* (2013.01); *H02J 3/381* (2013.01); *G05B 2219/2619* (2013.01); *H02J 2203/20* (2020.01); *H02J 2300/28* (2020.01)

(58) Field of Classification Search
CPC .......... H02J 3/241; H02J 3/381; G05B 19/042
See application file for complete search history.

(56) References Cited

U.S. PATENT DOCUMENTS

| | | | |
|---|---|---|---|
| 2017/0294852 A1* | 10/2017 | Correa Vasques .. | H02M 7/5395 |
| 2018/0167074 A1* | 6/2018 | Wu ........................... | H02J 3/40 |
| 2021/0273452 A1* | 9/2021 | Guest .................... | H02J 3/1842 |

OTHER PUBLICATIONS

Amin, et al., IEEE Journal of Emerging and Selected Topics in Power Electronics, vol. 5, No. 1, (2017) pp. 378-392.
Huang, et al., IEEE Transactions on Smart Grid, vol. 11, No. 1, (2020) pp. 501-516.
Yang, et al., IEEE Transactions on Power Electronics, vol. 35, No. 2, (2020) pp. 1473-1483.

\* cited by examiner

*Primary Examiner* — Mark A Connolly
(74) *Attorney, Agent, or Firm* — Analects Legal LLC

(57) ABSTRACT

The application relates to an oscillation active damping control method and system for grid-tied type-4 wind turbine generator. The method comprises: based on an interconnection model of multiple subsystems, constructing a stored energy function and a dissipated energy function of a current inner loop control subsystem, and interaction energy functions between the current inner loop control subsystem and other subsystems are constructed, then establishing an energy feedback model of Type-4 wind turbine generator; when the oscillation occurs, obtaining instantaneous angular frequency of the PLL, and then based on the energy feedback model, adjusting the current reference value of the q-axis current inner loop generated by the reactive power outer loop control subsystem, to make the stored energy function decrease with time, so as to suppress the oscillation.

15 Claims, 8 Drawing Sheets based on an interconnection model of the multiple subsystems, constructing a stored energy function and a dissipated energy function of the current inner loop control subsystem, and a first interaction energy function between the current inner loop control subsystem and a DC voltage control subsystem, a second interaction energy function between the current inner loop control subsystem and a phase lock loop subsystem, and a third interaction energy function between the current inner loop control subsystem and a reactive power outer loop control subsystem, then, establishing the energy feedback model of the grid-tied type-4 wind turbine generator — S110 when the oscillation occurs, obtaining the instantaneous angular frequency of the phase lock loop of the phaSe lock loop subsystem, based on the energy feedback model, adjusting the current reference value of the q-axis current inner loop generated by the reactive power outer loop control subsystem, to make the stored energy function value decrease with time, so as to suppress the oscillation — S120

US 12,119,649 B2

OSCILLATION ACTIVE DAMPING CONTROL METHOD AND SYSTEM FOR GRID-TIED TYPE-4 WIND TURBINE GENERATOR

CROSS-REFERENCE TO RELATED APPLICATIONS

This application claims priority to Chinese Patent Application No. 202110616024.X, filed on Jun. 2, 2021, which is hereby incorporated by reference in their entirety.

TECHNICAL FIELD

The application relates to the field of wind power generation and especially to an oscillation active damping control method and system for grid-tied type-4 wind turbine generator.

BACKGROUND

In recent years, the grid-tied type-4 wind turbine generator (direct-drive wind turbine generator) in large-scale wind power collection areas frequently results in sub/super-synchronous oscillation. The sub/super-synchronous oscillation components passing through multi-level power grids excites the torsional vibration of the turbine set shafting, which resulting in the accidents of generator tripping and sudden drop of HVDC (High Voltage Direct Current) power, threatening the safe operation of the power grid.

To solve this problem, two main methods based on the frequency domain analysis including parameter optimization and supplementary control branches are used to improve system damping characteristics with specific frequency range of the wind turbines, so as to suppress oscillation.

In the prior art, there are at least the following defects: the oscillation suppression method based on frequency domain can only suppress the oscillation within narrow frequency band, i.e., at a certain frequency point and its neighborhood. When the oscillation frequency changes, that is, it is not within the narrow frequency band, it is necessary to re-optimize the parameters or re-adjust the additional control branch to suppress the oscillation, which is difficult to meet the suppression requirements in the scenario of oscillation frequency varying. Thus, the existing oscillation suppression method is complex, the applicable frequency band is narrow, the applicability is poor, and the efficiency is low.

SUMMARY

Based on the above analysis, embodiments of present application aim to propose an oscillation active damping control method and system for grid-tied type-4 wind turbine generator, which is used to solve the problem that the prior art cannot effectively suppress the oscillation of the grid-tied type-4 wind turbine generator in the scenario of oscillation frequency varying.

On the one hand, an embodiment of present application provides an oscillation active damping control method for grid-tied type-4 wind turbine generator the grid-tied type-4 wind turbine generator consists of multiple subsystems, wherein the method comprising:

based on an interconnection model of the multiple subsystems, constructing a stored energy function and a dissipated energy function of a current inner loop control subsystem, and a first interaction energy function between the current inner loop control subsystem and a DC voltage control subsystem, a second interaction energy function between the current inner loop control subsystem and a phase lock loop subsystem, and a third interaction energy function between the current inner loop control subsystem and a reactive power outer loop control subsystem, then, establishing an energy feedback model of the grid-tied type-4 wind turbine generator;

when the oscillation of the grid-tied type-4 wind turbine generator occurs, obtaining instantaneous angular frequency of a phase lock loop in the phase lock loop subsystem; based on the energy feedback model, adjusting a current reference value of a q-axis current inner loop generated by the reactive power outer loop control subsystem, to make the stored energy function value decrease with time, so as to suppress the oscillation.

Further, constructing energy functions based on the interconnection model of the multiple subsystems, a small signal model of d-axis of the current inner loop control subsystem and a small signal model of q-axis of the current inner loop control subsystem;

the expression of the stored energy function is:

$$V_{s\_acc} = \frac{1}{2}L_1(\Delta I_{1d}^2 + \Delta I_{1d}^2) + \frac{1}{2}C_i(\Delta U_{id}^2 + \Delta U_{iq}^2),$$

where $V_{s\_acc}$ is the stored energy function, $L_1$ is filter inductance in the current inner loop control subsystem, $\Delta I_{1d}$ is d-axis perturbated current in the filter inductance $L_1$, $\Delta I_{1q}$ is q-axis perturbated current in the filter inductance $L_1$, $$C_i = \frac{1}{k_i \times k_{pwm}},$$

$k_i$ is an integral gain of a PI controller in the current inner loop control subsystem, $k_{pwm}$ is gain of a converter, $\Delta U_{1d}$ is perturbated state variable in an integral link of a d-axis PI controller in the current inner loop control subsystem, $\Delta U_{1q}$ is perturbated state variable in an integral link of a q-axis PI controller in the current inner loop control subsystem;

the expression of the dissipation energy function is:

$$V_{d\_acc} = -R_p\int\Delta I_{1d}^2 dt - R_p\int\Delta I_{1q}^2 dt,$$

where $V_{d\_acc}$ is the dissipation energy function, $R_p = k_p \times k_{pwm}$, $k_p$ is proportional gain of the PI controller in the current inner loop control subsystem, $k_{pwm}$ is the gain of the converter;

the expression of the first interaction energy function is:

$$V_{t\_dc} = \int\Delta I_{dref}\Delta U_{id}dt + \int\Delta I_{dref}\Delta I_{1d}dt,$$

where $V_{t\_dc}$ is the first interaction energy function, $\Delta I_{dref}$ is perturbated current reference value of the d-axis current inner loop generated by the DC voltage control subsystem;

the expression of the second interaction energy function is:

$$V_{t\_pll} = -k_1(\int\Delta\theta_{pll}\Delta U_{id}dt + R_p\int\Delta I_{1d}dt) + k_2(\int\Delta\theta_{pll}\Delta U_{iq}dt + R_p\int\Delta\theta_{pll}\Delta I_{1q}dt) + k_3\int\Delta\theta_{pll}\Delta I_{1d}dt + k_4\int\Delta\theta_{pll}\Delta I_{1q}dt,$$

where $V_{t\_pll}$ is the second interaction energy function, $\Delta\theta_{pll}$ is perturbated phase of the phase lock loop in the phase lock loop subsystem, $k_1$, $k_2$, $k_3$ and $k_4$ are constants whose expressions are shown below:

$$\begin{cases} k_1 = -I_{1q0} \\ k_2 = I_{1d0} \\ k_3 = -U_{pwmq0} + U_{pccq0} + \omega_0 L_1 I_{1d0} \\ k_4 = U_{pwmd0} - U_{pccd0} + \omega_0 L_1 I_{1q0} \end{cases} \quad 5$$

where $I_{1d0}$ is a steady-state value of d-axis current in the filter inductance $L_1$, $I_{1q0}$ is a steady-state value of q-axis current in the filter inductance $L_1$, $U_{pwmd0}$ is a steady-state value of the d-axis component of converter port voltage in the current inner loop control subsystem, $U_{pwmq0}$ is a steady-state value of the q-axis component of the converter port voltage of the current inner loop control subsystem, $U_{pccq0}$ is a steady-state value of d-axis voltage at a PCC (Point of Common Coupling), $U_{pccd0}$ is a steady-state value of q-axis voltage at the PCC, and $\circ\circ$ is rated angular frequency of the phase lock loop (PLL);

the expression of the third interaction energy function is:

$$V_{t\_q} = \int \Delta I_{qref} \Delta U_{iq} dt + \int R_p \Delta I_{qref} \Delta I_{1q} dt,$$

where $V_{t\_q}$ is the third interaction energy function, N V is perturbated current reference value of the q-axis current inner loop generated by the reactive power outer loop control subsystem.

Further, the small signal model of d-axis of the current inner loop control subsystem is:

$$\begin{cases} C_i \dfrac{d\Delta U_{id}}{dt} = \Delta I_{1d} + F_{Cd} \\ L_1 \dfrac{d\Delta I_{1d}}{dt} = -R_p \Delta I_{1d} + \Delta U_{id} + F_{Ld}, \\ F_{Cd} = \Delta I_{dref} - k_1 \Delta \theta_{pll} \\ F_{Ld} = k_3 \Delta \theta + (\Delta I_{dref} - k_1 \Delta \theta_{pll}) \end{cases}$$

the small signal model of the q-axis of the current inner loop control subsystem is given as:

$$\begin{cases} C_i \dfrac{d\Delta U_{iq}}{dt} = -\Delta I_{1q} + F_{Cq} \\ L_1 \dfrac{d\Delta I_{1q}}{dt} = -R_p \Delta I_{1q} + \Delta U_{iq} + F_{Lq}. \\ F_{Cq} = \Delta I_{qref} - k_2 \Delta \theta_{pll} \\ F_{Lq} = k_4 \Delta \theta_{pll} + R_p(\Delta I_{qref} + k_2 \Delta \theta_{pll}) \end{cases}$$

Further, the energy feedback model is given as:

$$V_{s\_acc} = V_{d\_acc} + V_{t\_dc} + V_{t\_pll} + V_{t\_q}.$$

Further, according to the following compensation function, adjusting the current reference value of the q-axis the current inner loop generated by the reactive power outer loop control subsystem:

$$dI_{qref} = -I_{dref} \times \int \omega_{pll} dt,$$

where $dI_{qref}$ is adjusted current reference value of the q-axis current inner loop, $I_{dref}$ is instantaneous current reference value of the d-axis current inner loop generated by the DC voltage control subsystem, $\omega_{pll}$ is deviation of the angular frequency measured by the phase lock loop, that is, the deviation between the instantaneous angular frequency measured by the phase lock loop and the rated angular frequency.

Further, the deviation of the angular frequency measured by the phase lock loop and the perturbated phase of PLL in the phase lock loop subsystem satisfy the following relationship:

$$\Delta \theta_{pll} = \int \omega_{pll} dt,$$

where $\Delta \theta_{pll}$ is the perturbated phase of PLL in the phase lock loop subsystem, $\omega_{pll}$ is the deviation of the angular frequency measured by the phase lock loop.

based on the above relationship and the compensation function, the reduction of the third interaction energy function value generated by adjusted current reference value of the q-axis current inner loop which is generated by the reactive power outer loop control subsystem is offset by the increment of the second interaction energy function value that induced by the perturbated phase of the phase lock loop when the oscillation occurs, to make the stored energy function decrease with time, so as to suppress the oscillation.

Further, the oscillation comprises oscillation in sub-synchronous frequency band, from 2.5 Hz to 50 Hz, or oscillation in super-synchronous frequency band, from 50 Hz to 100 Hz.

On the other hand, another embodiment of present application provides an oscillation active damping control system for grid-tied type-4 wind turbine generator, comprising:

a model building module is configured to base on an interconnection model of multiple subsystems, construct a stored energy function, and a dissipated energy function of the current inner loop control subsystem in the multiple subsystems, and a first interaction energy function between the current inner loop control subsystem and a DC voltage control subsystem, a second interaction energy function between the current inner loop control subsystem and a phase-locked loop subsystem, and a third interaction energy function between the current inner loop control subsystem and a reactive power outer loop control subsystem, then, establish an energy feedback model;

an adjustment module is configured to obtain the instantaneous angular frequency of a phase lock loop in the phase lock loop subsystem when the oscillation of the grid-tied type-4 wind turbine generator occurs, based on the energy feedback model, adjust a current reference value of a q-axis current inner loop generated by the reactive power outer loop control subsystem, to make a value of the stored energy function decrease with time, so as to suppress the oscillation.

Further, the adjustment module is configured to adjust a current reference value of a q-axis current inner loop based on the following compensation function.

$$dI_{qref} = -I_{dref} \times \int \omega_{pll} dt,$$

where $dI_{qref}$ is adjusted current reference value of the q-axis current inner loop, $I_{dref}$ is instantaneous current reference value of a d-axis current inner loop generated by the DC voltage control subsystem, $\omega_{pll}$ is deviation of angular frequency measured by the phase lock loop, that is, the deviation between the instantaneous angular frequency measured by the phase lock loop and rated angular frequency.

Further, the oscillation active damping control system comprises a monitoring module is configured to measure the angular frequency of the phase lock loop in real time.

Compared with prior arts, embodiment of present application has the follow contributions:

In the proposed oscillation active damping control method and system for grid-tied type-4 wind turbine generator, based on the stored energy and the dissipated energy of the current inner loop control subsystem, and the interaction energy between current inner loop control subsystem and other subsystems, an energy feedback model is constructed. By monitoring the angular frequency of phase lock loop in real time, adjusting the current reference value of the q-axis current inner loop to make the stored energy decrease over time, so as to suppress oscillation. By adjusting the variation rate of stored energy to negative, this method ensures the oscillation amplitude of wind turbine generator show an attenuation trend, no matter how the oscillation frequency changes in the sub-synchronous frequency band and super-synchronous frequency band, so as to effectively suppress oscillation.

In the proposed method oscillation active damping control method and system for grid-tied type-4 wind turbine generator, when the oscillation frequency of the wind turbine generator changes, the angular frequency of the phase lock loop also changes correspondingly, thus, by monitoring the angular frequency of the phase lock loop in real time, the instantaneous deviation between the instantaneous angular frequency measured by phase lock loop and rated angular frequency is obtained. And the current reference value of the q-axis current inner loop is adjusted by this deviation, so the oscillation of the wind turbine generator can be suppressed automatically, this method is not only easy to implement but also is effective.

In the application, the above technical schemes can also be combined with each other to realize more preferred combination schemes. Other features and advantages of the application will be described in the following instructions, and some advantages may become apparent from the instructions or be understood by implementing the application. The object and other advantages of the application can be realized and obtained through the contents specially pointed out in the instructions and the accompanying drawings.

BRIEF DESCRIPTION OF DRAWINGS

The attached figures are only for the purpose of illustrating specific embodiments, and are not considered to limit the present application. In the whole figures, the same reference symbols indicate the same components.

wherein: 100—model building module, 120—adjustment module, 130—monitoring module.

DESCRIPTION OF EMBODIMENTS

The preferred embodiment of the present disclosure is described in detail with reference to the attached drawings. The accompanying drawings form a part of the present application and are used together with embodiments of the present disclosure to explain the principles of the disclosure and are not intended to limit the scope of the disclosure.

Figure 1:
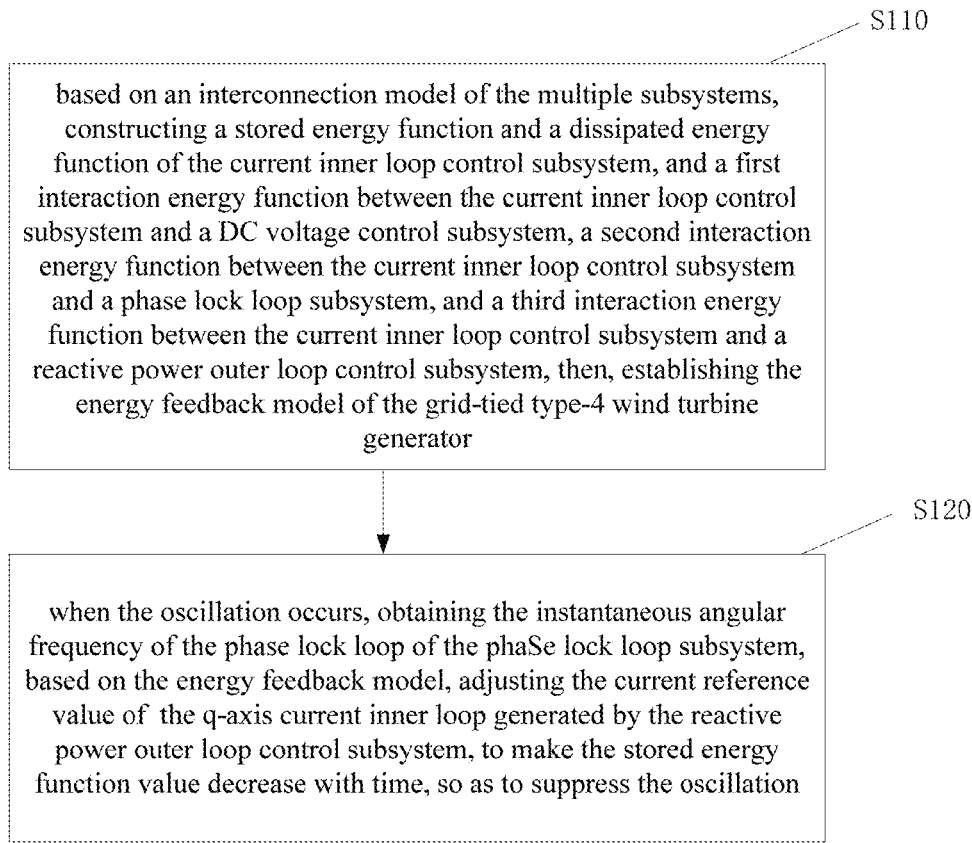
FIG. 1 is a flowchart of the oscillation active damping control method for grid-tied type-4 wind turbine generator according to an embodiment of the present application.

One embodiment of present application proposes an oscillation active damping control method for grid-tied type-4 wind turbine generator. As shown in FIG. 1, the method includes the following two steps.

Since the permanent magnet synchronous generator (PMSG) and machine-side converter (MSC) in type-4 wind turbine generator have little influence on the sub/super-synchronous oscillation, the sub/super-synchronous oscillation is mainly related to the grid-side converter (GSC) in type-4 wind turbine generator. Where the grid-tied type-4 wind turbine generator contains a current inner loop control subsystem, a DC voltage control subsystem, a PLL subsystem, a reactive power outer control loop subsystem and a power grid subsystem.

S110: based on an interconnection model of the multiple subsystems, constructing a stored energy function and a dissipated energy function of the current inner loop control subsystem, and a first interaction energy function between the current inner loop control subsystem and a DC voltage control subsystem, a second interaction energy function between the current inner loop control subsystem and a phase lock loop subsystem and a third interaction energy function between the current inner loop control subsystem and a reactive power outer loop control subsystem, then, establishing an energy feedback model of the grid-tied type-4 wind turbine generator;

S120: when the oscillation of the grid-tied type-4 wind turbine generator occurs, obtaining the instantaneous angular frequency of a phase lock loop in the phase lock loop subsystem. And based on the energy feedback model, adjusting the current reference value of q-axis of the current inner loop generated by the reactive power outer loop control subsystem, to make the value of the stored energy function decrease with time, so as to suppress the oscillation.

The beneficial effects of this embodiment are: in the sub-synchronous band or super-synchronous band, no matter how the oscillation frequency of the wind turbine generator varies, it can ensure that the corresponding oscillation amplitude shows an attenuation trend by adjusting the stored energy function to decrease with time, so as to suppress the oscillation. The principle based on the above embodiment is explained:

The each previously mentioned subsystem in the interconnection model can all be unified as the following general form:

$$\begin{cases} C\dfrac{d\Delta U}{dt} = -K_L \Delta I + F_C \\ L\dfrac{d\Delta I}{dt} = -K_R \Delta I + K_C \Delta U + F_L \end{cases},$$

Where C is equivalent capacitance in the general form of subsystem, L is equivalent inductance in the general form of subsystem, $K_R$ is equivalent resistance in the general form of subsystem, $\Delta U$ and $\Delta I$ are an equivalent voltage variable and equivalent current variable in the general form of subsystem, respectively. $K_C$ is the magnification of the equivalent voltage variable $\Delta U$. $K_L$ is the magnification of the equivalent current variable $\Delta I$. $F_C$ represents the disturbance to the equivalent voltage variable $\Delta U$ of this subsystem from other subsystems in all interaction links acting on this subsystem. $F_L$ represents the disturbance to the equivalent current variable $\Delta I$ of this subsystem from other subsystems in all interaction links acting on this subsystem.

First, divide the first equation by the second equation in formula (1). Then, according to the first integration principle, conduct cross multiplication and then do integration on both sides of obtained equation, so that the following results is obtained:

$$\frac{1}{2} \cdot L \cdot K_L \cdot \Delta I^2 + \frac{1}{2} \cdot C \cdot K_C \cdot \Delta U^2 +$$

-continued $$K_L K_R \int \Delta I^2 dt - K_L \int F_L \Delta I dt - K_C \int F_C \Delta U dt = Cons,$$

where Cons is a constant term.

The general form of energy function for each subsystem is:

$$V = V_s - V_d - V_t,$$

$$\begin{cases} V_s = \dfrac{1}{2} C \cdot K_C \cdot \Delta U^2 + \dfrac{1}{2} L \cdot K_L \cdot \Delta I^2 \\ V_d = -K_L K_R \int \Delta I^2 dt \\ V_t = K_C \int F_C \Delta U dt + K_L \int F_L \Delta I dt \end{cases} \quad (2)$$

where $V_s$ is the general form of the stored energy. $V_d$ is general form of the dissipation energy. $V_t$ is the general form of interaction energy between the subsystems, where the 1st term in $V_t$ is the general form of interaction energy via interaction link $F_C$, and the 2st term is the general form of interaction energy via interaction link $F_L$.

Calculate the partial derivative of the energy function V of the subsystem with respect to time t.

$$\begin{aligned}\dot{V} &= \frac{\partial V}{\partial \Delta U} \cdot \frac{d\Delta U}{dt} + \frac{\partial V}{\partial \Delta I} \cdot \frac{d\Delta I}{dt} + \frac{\partial V}{\partial t} \\ &= (K_C F_C \cdot \Delta U - K_L K_C \Delta U \cdot \Delta I) \\ &+ \left(K_L F_L \cdot \Delta I + K_L K_C \cdot \Delta U \Delta I - K_L K_R \Delta I^2\right) \\ &+ \left(K_L K_R \cdot \Delta I^2 - K_C F_C \cdot \Delta U - K_L F_L \cdot \Delta I\right) = 0,\end{aligned}$$

It can be seen that, the derivative of energy function V with respect to time t is 0, which proves that the system conforms to the energy conservation. According to the energy conservation, the stored energy is equal to the sum of the dissipation energy and the interaction energy, i.e., $$V_s = V_d + V_t.$$

When the wind turbine generator is disturbed causing sub/super-synchronous oscillation with mode $\alpha + j\omega_c$, the corresponding oscillation component in the equivalent voltage variable $\Delta U$ and the equivalent current variable $\Delta I$ can be expressed as:

$$\Delta U = A_U e^{\alpha t} \cos(\omega_c t + \theta_U)$$

$$\Delta I = A_1 e^{\alpha t} \cos(\omega_c t + \theta_1)$$

Where $\alpha$ is a damping factor of the wind turbine generator corresponding to the oscillation mode, $\omega_c$ is an oscillation frequency corresponding to the oscillation mode, $A_U$ is an amplitude of voltage component of the corresponding subsystem, $\theta_U$ is an initial phase of voltage component, $A_1$ is an amplitude of current component of the corresponding subsystem, $\theta_1$ is an initial phase of current component.

When the wind turbine generator is disturbed causing sub/super-synchronous oscillation with mode $\alpha + j\omega_c$, the corresponding oscillation component in disturbance $F_C$ can be expressed as:

$$F_C = A_{FC} e^{\alpha t} \cos(\omega_c t + \theta_{FC}),$$

When the wind turbine generator is disturbed causing sub/super-synchronous oscillation with mode $\alpha+j\omega_c$, the corresponding oscillation component in disturbance $F_L$ can be expressed as:

$$F_L = A_{FL} e^{\alpha t} \cos(\omega_c t + \theta_{FL}),$$

Where $A_{FC}$ is the amplitude of the disturbance to the equivalent voltage variable $\Delta U$ in interaction links, $\theta_{FC}$ is the initial phase of the disturbance to the equivalent voltage variable $\Delta U$ in interaction links, $A_{FL}$ is the amplitude of the disturbance to the equivalent current variable $\Delta I$ in interaction links, $\theta_{FL}$ is the initial phase of the disturbance to the equivalent current variable $\Delta I$ in interaction links.

Apply the above expressions ($\Delta U$, $\Delta I$, $F_C$, $F_L$) to the stored energy function $V_S$, and calculate the partial derivative with respect to time t, the derivative of $V_S$ to t, i.e., $\dot{V}_s(t)$ is given as:

$$\dot{V}_s(t) = \dot{V}_{s\_ac}(t) + \dot{V}_{s\_dc}(t),$$

where $\dot{V}_{s\_ac}(t)$ and $\dot{V}_{s\_dc}(t)$ are periodic and non-periodic components of the derivative of the stored energy function respectively. And the expressions are given as:

$$\dot{V}_{s\_ac}(t) = C \cdot K_C \cdot A_U^2 \left( \frac{\alpha \cos(2\omega_c t + 2\theta_U) - \omega_c \cdot \sin(2\omega_c t + 2\theta_U)}{2} \right) e^{2\alpha t}$$

$$+ L \cdot K_L \cdot A_I^2 \left( \frac{\alpha \cdot \cos(2\omega_c t + 2\theta_I) - \omega_c \cdot \sin(2\omega_c t + 2\theta_I)}{2} \right) e^{2\alpha t},$$

$$\dot{V}_{s\_dc}(t) = \lambda_s e^{2\alpha t} = \alpha \left( \frac{C \cdot K_C \cdot A_U^2 + L \cdot K_L \cdot A_I^2}{2} \right) e^{2\alpha t},$$

Since term $$\left( \frac{C \cdot K_C \cdot A_U^2 + L \cdot K_L \cdot A_I^2}{2} \right)$$

in $\dot{V}_{s\_dc}(t)$ is constantly positive, the analytical relationship between the real part $\alpha$ of sub/super-synchronous oscillation mode $\alpha$-j$\omega$, and the change rate of the stored energy function $V_s$ is established, and it is proved that no matter how the oscillation frequency $\omega_c$ changes, the oscillation divergence and convergence processes correspond to the increasing and decreasing processes of the stored energy function $V_s$ respectively.

Specifically, if the non-periodic component of the stored energy function $V_s$ increases progressively, it means $\lambda_s > 0$ and the real part of eigenvalue (feature value) $\alpha > 0$ in the $\dot{V}_{s\_dc}(t)$, i.e., oscillation of the wind turbine generator diverges. If the non-periodical component decreases progressively, it means $\lambda_s < 0$ and the real part of eigenvalue $\alpha < 0$ in $\dot{V}_{s\_dc}(t)$, i.e., the oscillation of the wind turbine generator converges. If the non-periodical component neither increases nor decreases, it means $\lambda_s = 0$ and the real part of eigenvalue $\alpha = 0$ in $\dot{V}_{s\_dc}(t)$, i.e., the oscillation of the wind turbine generator has a constant amplitude.

Based on the above analysis, it is worth emphasizing that the variation trend of the stored energy of the wind turbine generator correlates strictly positively with the variation trend of oscillation amplitude. Moreover, the variation trend of the stored energy can be controlled by the dissipation energy and the interaction energy. Therefore, by controlling the stored energy of the current inner control loop subsystem of the grid-side converter to show a decreasing trend, the oscillation of the wind turbine generator can be suppressed.

Thus, the damping control strategy is inspired. Specifically, by making the stored energy decrease progressively, the real part $\alpha$ of the corresponding sub/super-synchronous oscillation mode can be kept negative. In this case, no matter how the oscillation frequency $\omega_c$ varies, the amplitude $A_1 e^{\alpha t}$ of sub/super-synchronous oscillation component $A_1 e^{\alpha t} \cos(\omega_c t + \varphi)$ of the output current of GSC (grid-side converter) always exhibits an attenuation trend. In other words, the WTG (wind turbine generator) does not inject continuously diverging oscillation component in current to the power grid, thus the interaction between the wind turbine generator and power grid is blocked, and the active damping control in a broad frequency band can be realized.

Figure 2:
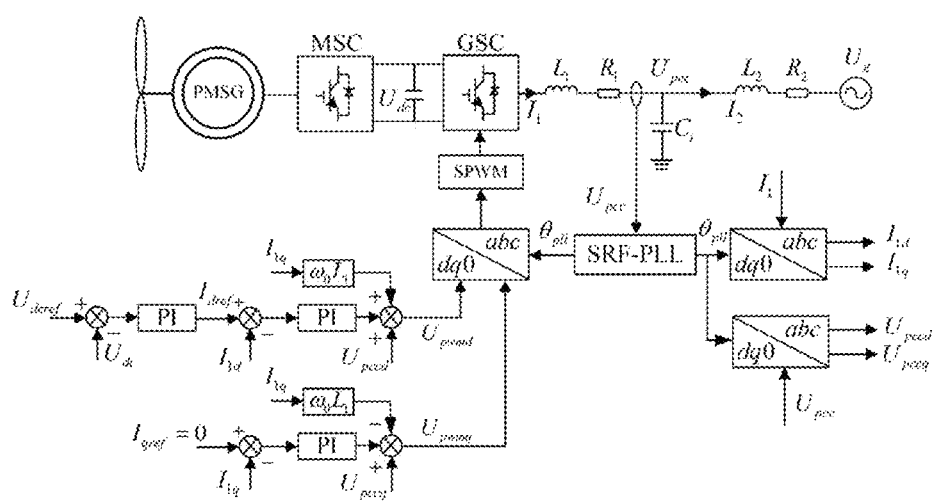
FIG. 2 is a schematic structure diagram of the grid-tied type-4 wind turbine generator according to an embodiment of the present application.

The structure of grid-tied type-4 wind turbine generator is shown in FIG. 2. It consists of generator-side components which include a permanent magnetic synchronous generator (PMSG) and a machine-side converter (MSC), and grid-side components which include a grid-side converter (GSC), DC bus, an AC filter inductance $L_1$, an equivalent resistance $R_1$, a filter capacitance $C_f$, and an equivalent grid inductance $L_2$ and a resistance $R_2$.

Figure 3:
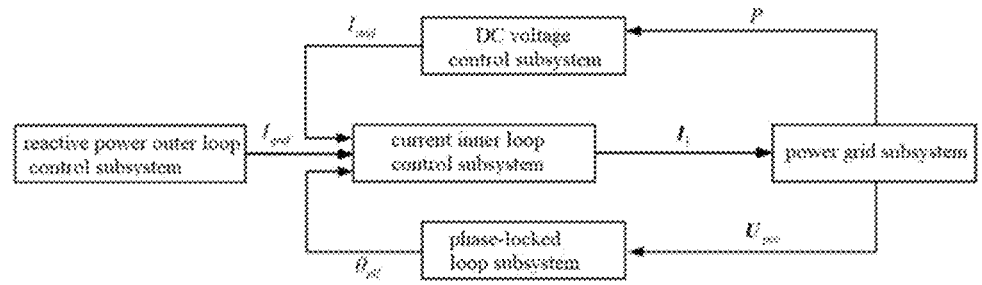
FIG. 3 is a schematic diagram of the interconnection model between different sub-systems of the grid-tied type-4 wind turbine generator according to an embodiment of the present application.

Since the permanent magnet synchronous generator (PMSG) and machine-side converter (MSC) in type-4 wind turbine generator have little influence on the sub/super-synchronous oscillation, the sub/super-synchronous oscillation is mainly related to the grid-side converter (GSC) in type-4 wind turbine generator. Accordingly, the interconnection model of the multiple subsystems based on the structure of the grid-tied type-4 wind turbine generator is shown in FIG. 3. The current inner control loop subsystem of the GSC includes an inner loop PI controller, the $L_1$ and the $R_1$. The DC voltage control loop subsystem includes a DC voltage PI controller and the DC bus. The PLL subsystem includes a PI controller and a voltage controlled oscillator. The reactive power outer loop control subsystem has no dynamic process in unit power factor control since $I_{qref}$ is 0. And the equivalent power grid subsystem includes the $C_f$, $L_2$ and $R_2$. In FIG. 3, each arrow represents the interaction link between the corresponding two subsystems, and the symbol on the arrow represents the variable in the expression of the interaction link. P is the active power output of GSC. $I_1$ is the current output of GSC, that is the current in the inductance $L_1$. $I_{dref}$ is the current reference value of the d-axis current inner loop generated by the DC voltage control subsystem. $I_{qref}$ is the current reference value of the q-axis current inner loop generated by the reactive power outer loop control subsystem. $U_{pcc}$ is the voltage at PCC (point of common coupling). $\theta_{pll}$ is the phase of $U_{pcc}$ measured by the PLL.

In step 110, constructing the energy functions based on the interconnection model of multiple subsystems, a small signal model of d-axis of the current inner loop control subsystem and a small signal model of q-axis of the current inner loop control subsystem.

Specifically, according to the mathematical model of the subsystem, taking into account voltage feedforward decoupling item of the power grid and cross decoupling terms of dq axes, the small signal model of d-axis of the current inner loop control subsystem is given as:

$$\begin{cases} C_i \dfrac{d\Delta U_{id}}{dt} = -\Delta I_{1d} + F_{Cd} \\ L_1 \dfrac{d\Delta I_{1d}}{dt} = -R_p \Delta I_{1d} + \Delta U_{id} + F_{Ld} \\ F_{Cd} = \Delta I_{dref} - k_1 \Delta \theta_{pll} \\ F_{Ld} = k_3 \Delta \theta + (\Delta I_{dref} - k_1 \Delta \theta_{pll}), \end{cases}$$

The small signal model of q-axis of the current inner loop control subsystem is given as:

$$\begin{cases} C_i \dfrac{d\Delta U_{iq}}{dt} = -\Delta I_{1q} + F_{Cq} \\ L_1 \dfrac{d\Delta I_{1q}}{dt} = -R_p \Delta I_{1q} + \Delta U_{iq} + F_{Lq} \\ F_{Cq} = \Delta I_{qref} - k_2 \Delta \theta_{pll} \\ F_{Lq} = k_4 \Delta \theta_{pll} + R_p(\Delta I_{qref} + k_2 \Delta \theta_{pll}). \end{cases}$$

Specifically, the obtained small signal models of d-axis and q-axis of the current inner loop control subsystem are compared with the general form of the mathematical model of the subsystem, and the detailed expression of state variables and interaction links of the small signal models of the d-axis and the q-axis of the current inner loop control subsystem are substituted into the general expression of the energy function to construct the detailed energy functions.

Specifically, the expression of the stored energy function is given as:

$$V_{s\_acc} = \frac{1}{2} L_1 (\Delta I_{1d}^2 + \Delta I_{1q}^2) + \frac{1}{2} C_i (\Delta U_{id}^2 + \Delta U_{iq}^2),$$

Where $V_{s\_acc}$ is the stored energy function, $L_1$ is the filter inductance in the current inner loop control subsystem, $\Delta I_{1d}$ is the d-axis perturbated current in filter inductance $L_1$, $\Delta I_{1q}$ is the q-axis perturbated current in the filter inductance $L_1$, $$C_i = \frac{1}{k_i \times k_{pwm}},$$

$k_i$ is the integral gain of the PI controller in the current inner loop control subsystem, $k_{pwm}$ is gain of a converter, $\Delta U_{1d}$ is perturbated state variable of integral link of d-axis PI controller in the current inner loop control subsystem, $\Delta U_{1q}$ is perturbated state variable of integral link of q-axis PI controller in the current inner loop control subsystem.

The expression of the dissipation energy function is given as:

$$V_{d\_acc} = -R_p \int \Delta I_{1d}^2 dt - R_p \int \Delta I_{1q}^2 dt,$$

Where $V_{d\_acc}$ is the dissipation energy function, $R_p = k_p \times k_{pwm}$, $k_p$ is proportional gain of the PI controller in the current inner loop control subsystem, $k_{pwm}$ is the gain of the converter.

The expression of the first interaction energy function is given as:

$$V_{t\_dc} = \int \Delta I_{dref} \Delta U_{id} dt + \int \Delta I_{dref} \Delta I_{1d} dt,$$

Where $V_{t\_dc}$ is the first interaction energy function, $\Delta I_{dref}$ is perturbated current reference value of the d-axis current inner loop generated by the DC voltage control subsystem.

The expression of the second interaction energy function is given as:

$$V_{t\_pll} = -k_1(\int \Delta\theta_{pll} \Delta U_{id} dt + R_p \int \Delta\theta_{1d} dt) + k_2(\int \Delta\theta_{pll} \Delta U_{iq} dt + R_p \int \Delta\theta_{pll} \Delta I_{1q} dt) + k_3 \int \Delta\theta_{pll} \Delta I_{1d} dt + k_4 \int \Delta\theta_{pll} \Delta I_{1q} dt,$$

Where $V_{t\_pll}$ is the second interaction energy function, $\Delta\theta_{pll}$ is perturbated phase measured by the phase lock loop in the phase lock loop subsystem, $k_1$, $k_2$, $k_3$, and $k_4$ are constants whose expressions are shown below.

$$\begin{cases} k_1 = -I_{1q0} \\ k_2 = I_{1d0} \\ k_3 = -U_{pwmq0} + U_{pccq0} + \omega_0 L_1 I_{1d0} \\ k_4 = U_{pwmd0} - U_{pccd0} + \omega_0 L_1 I_{1q0}, \end{cases}$$

Where $I_{1d0}$ is a steady-state value of d-axis current in the filter inductance $L_1$, $I_{1q0}$ is a steady-state value of q-axis current in the filter inductance $L_1$, $U_{pwmd0}$ is a steady-state value of the d-axis component of converter port voltage in the current inner loop control subsystem, $U_{pwmq0}$ is a steady-state value of the q-axis component of the converter port voltage in the current inner loop control subsystem, $U_{pccd0}$ is a steady-state value of d-axis voltage at PCC (point of common coupling), $U_{pccq0}$ is a steady-state value of q-axis voltage at PCC (point of common coupling), and $\omega_0$ is rated angular frequency of the phase lock loop (PLL), $\omega_0 = 100\pi$. The converter means the GSC in this embodiment.

The expression of the third interaction energy function is given as:

$$V_{t\_q} = \int \Delta I_{qref} \Delta U_{iq} dt + \int R_p \Delta I_{qref} \Delta I_{1q} dt,$$

where $V_{t\_q}$ is the third interaction energy function, $\Delta I_{qref}$ is perturbated current reference value of the q-axis current inner loop generated by the reactive power outer loop control subsystem.

The energy feedback model is given as follow based on the above energy functions.

$$V_{s\_acc} = V_{d\_acc} + V_{t\_dc} + V_{t\_pll} + V_{t\_q}.$$

Figure 4:
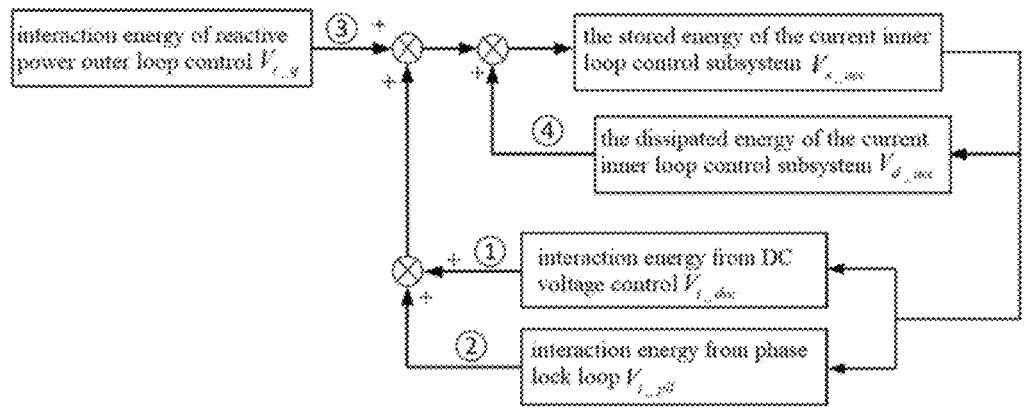
FIG. 4 is a schematic diagram of the energy feedback model constructed according to an embodiment of the present application.

Specifically, according to the summation relationship of different energies in expression of the energy conservation, the energy feedback model is constructed by taking the stored energy of the current inner loop control subsystem as the controlled object, and taking the internal dissipation energy of the current inner loop control subsystem and the interaction energy between the current inner loop control subsystem and the DC voltage control subsystem, the phase lock loop subsystem, the reactive outer loop control subsystem as the feedback channels. Accordingly, there are totally four feedback channels as shown in FIG. 4: 1) The active power energy feedback channel formed by the first interaction energy between the DC voltage control subsystem and the current inner loop control subsystem (i.e., ① in FIG. 4); 2) the PLL energy feedback channel formed by the second interaction energy between the PLL subsystem and the current inner loop control subsystem (i.e., ② in FIG. 4); 3) the reactive power energy feedback channel formed by the third interaction energy between the reactive power outer loop control subsystem and the current inner loop control subsystem (i.e., ③ in FIG. 4); 4) The dissipation energy feedback channel formed by the dissipation energy of the current inner loop control subsystem itself (i.e., ④ in FIG. 4).

The energy characteristics of each feedback channel are analyzed below respectively:

For the first interaction energy function $V_{t\_dc}$ corresponding to ① the active power energy feedback channel, according to the small signal model of d-axis of the current inner loop control subsystem, the dynamic relationship between $\Delta I_{1d}$, $\Delta I_{dref}$ and $\Delta U_{id}$ are:

$$\Delta U_{id} = \frac{-\Delta I_{1d} + \Delta I_{dref}}{C_i s}$$

-continued $$\Delta I_{dref} = \frac{L_1 C_i s^2 + R_p C_i s + 1}{C_i s + 1} \Delta I_{1d}$$

Applying them to the expression of the first interaction energy function $V_{t\_dc}$ corresponding to the active power energy feedback channel yields:

$$V_{t\_dc} = \int \frac{\Delta I_{dref}}{C_i s} \Delta I_{dref} dt + \int \left( R_p + L_1 s + \frac{1}{C_i s} \right) \frac{C_i s - 1}{C_i s + 1} \Delta I_{1d}^2 dt$$

For the $1^{st}$ term in the above equation, because there is the integral part $$\frac{1}{C_i s},$$

phase difference of integration variable is 90°. Thus energy in the $1^{st}$ term is 0 and not affect the stability of the wind turbine generator, it can be negligible. But for the $2^{nd}$ term in the above equation, the sum $V_{sum}$ of the $2^{nd}$ term in the above equation and the $1^{st}$ term (i.e., $-R_p \int \Delta I_{1d}^2 dt$) in the dissipation energy function $V_{d\_acc}$ is calculated:

$$V_{sum} = \int \underbrace{\left( \left( R_p + L_1 s + \frac{1}{C_i s} \right) \frac{C_i s - 1}{C_i s + 1} - R_p \right)}_{G(s)} \Delta I_{1d}^2 dt$$

whether energy $V_{sum}$ above increasing or decreasing with time depends on the phase value of transfer function G(s). When the phase of G(s) falls in the range of [−90°, 90°], $V_{sum}$ increases with time; when the phase of G(s) falls in the range of [90°, 270°], $V_{sum}$ decreases with time. And, by applying jω to G(s) and judging the sign (positive or negative) of the real part of G(jω) (i.e., Re(G(jω))), the phase of G(s) can be obtained.

$$Re(G(j\omega)) = -\frac{2\left((R_p - 1) + \omega^2 L_1 C_i\right)}{\omega^2 C_i^2 + 1},$$

In order to guarantee the response speed of the current inner loop, usually $R_p > 1$. Thus, Re(G(jω))<0, the phase of G(s) remains in [90°, 270°], and $V_{sum}$ decreases with time. In other words, the first interaction energy function $V_{t\_dc}$ corresponding to the active power energy channel can be offset by d-axis dissipation energy $-R_p \int \Delta I_{1d}^2 dt$ of the current inner loop control subsystem, and thus it has no adverse effect on the stability of wind turbine generator.

For the second interaction energy function $V_{t\_pll}$ corresponding to ② the PLL energy feedback channel, when the Type-4 WTG operates in unit power factor, the q-axis steady-state component $I_{1q0}$ of the current flowing through inductance $L_1$ is 0 in control coordinate, i.e., $I_{1q0}$=0. Thus in the expression of $V_{t\_pll}$, constant term $k_1$ is 0. And the values of constant terms $k_3$ and $k_4$ can be analyzed according to the following dynamic equation of the inductance $L_1$:

$$\begin{cases} L_1 \frac{dI_{1d}}{dt} = \omega_0 L_1 I_{1q} + U_{pwmd} - U_{pccd} \\ L_1 \frac{dI_{1q}}{dt} = -\omega_0 L_1 I_{1q} + U_{pwmq} - U_{pccq} \end{cases}$$

where $I_{1d}$ and $I_{1q}$ are d-axis and q-axis current flowing through the inductance $L_1$; $U_{pwmd}$ and $U_{pwmq}$ are d-axis and q-axis voltage of the GSC; $U_{pccd}$ and $U_{pccq}$ are d-axis and q-axis voltage at the PCC.

The steady-state value of the differential term in the above equation is 0, thus:

$$\begin{cases} \omega_0 L_1 L_{1q0} + U_{pwmd0} - U_{pccd0} = 0 \\ -\omega_0 L_1 L_{1q0} + U_{pwmq0} - U_{pccq0} = 0 \end{cases}$$

Comparing the above equation with the expressions of $k_3$ and $k_4$, it can be seen that $k_3$ and $k_4$ are both 0. Therefore, the expression of the PLL energy feedback channel $V_{t\_pll}$ can be written as:

$$V_{t\_pll} = \int k_2 \Delta \theta_{pll} \Delta U_{1q} dt + \int R_p k_2 \Delta \theta_{pll} \Delta I_{1q} dt$$

The constant term $k_2$ and state variables $\Delta \theta_{pll}$, $\Delta U_{iq}$ and $\Delta I_{1q}$ are not 0, thus $V_{t\_pll}$ in oscillating process is no longer 0, and it may have adverse effect on the oscillation.

According to the above analysis, the q-axis component of dissipation energy $V_{d\_acc}$ (i.e., $-R_p \int \Delta I_{1q}^2 dt$) decreases progressively with time. The sum of d-axis component of dissipation energy $V_{d\_acc}$ (i.e., $-R_p \int \Delta I_{1d}^2 dt$) and the first interaction energy $V_{t\_dc}$ corresponding to the active power energy feedback channel decreases progressively with time. Thus, in order to make the stored energy $V_{s\_acc}$ decrease over time so as to suppress oscillation, the second interaction energy $V_{t\_pll}$ corresponding to the PLL energy feedback channel and the third interaction energy $V_{t\_q}$ corresponding to the reactive power energy feedback channel should be adjusted.

Since the third interaction energy $V_{t\_q}$ corresponding to the reactive power energy feedback channel (i.e., the third interaction energy function) is originally 0 when the wind turbine generator is running stably, it can be adjusted flexibly. Therefore, in order to suppress the influence of the second interaction energy $V_{t\_pll}$ of the PLL energy feedback channel, by constructing a compensation function in the current reference value $I_{dref}$ of the q-axis current inner loop, a none-zero additional reactive power energy feedback channel, i.e., $dV_{t\_q}$, can be generated to reversely compensate for the effect of PLL energy feedback channel $V_{t\_pll}$ on the stability. When the wind turbine generator is running stably, the third interaction energy $V_{t\_q}$ corresponding to the reactive power energy feedback channel is 0, thus when oscillation occurs, the third interaction energy $v_{t\_q}$ corresponding to the reactive power energy feedback channel is adjusted, variation rate $dV_{t\_q}$ is the adjusted third interaction energy corresponding to the reactive power energy feedback channel.

Figure 5:
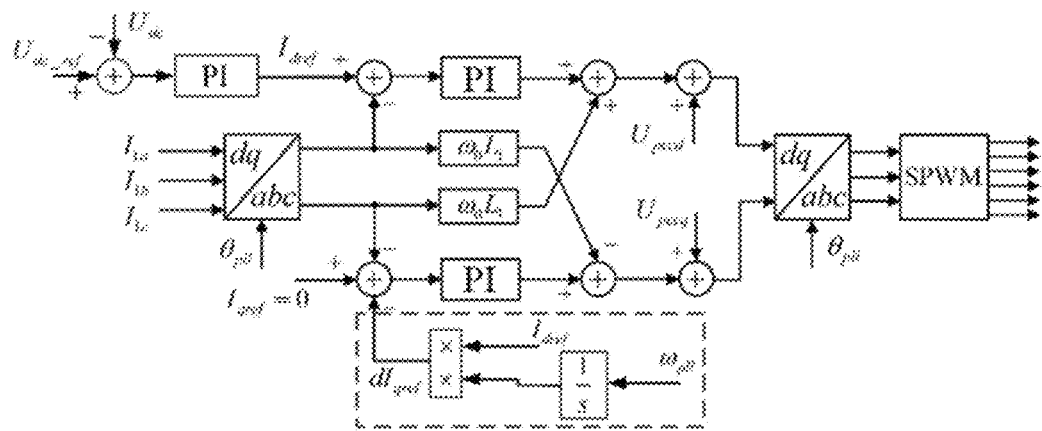
FIG. 5 is a schematic structure diagram of the oscillation active damping control method for grid-tied type-4 wind turbine generator according to an embodiment of the present application.

According to the above idea, in order for the third interaction energy $dV_{t\_q}$ generated by the additional reactive power energy feedback channel being offset by the second interaction energy $V_{t\_pll}$ generated by the PLL energy feedback channel, parameters such as PLL variable $\Delta \theta_{pll}$ and constant term $k_2$ in the expression of $V_{t\_pll}$ need be introduced to the compensation function. The following compensation function in the current reference value of the q-axis current inner loop is designed:

$$dI_{qref} = -I_{dref} \times \int \omega_{pll} dt = -I_{dref} \times \Delta\theta_{pll}$$

where ω is the deviation of PLL angular frequency from the rated angular frequency, the deviation is 0 when the wind turbine generator is in steady state. $I_{dref}$ is the current reference value of the d-axis current inner loop at the present moment. The active damping control (that is, oscillation suppression) diagram containing the above compensation function is shown in FIG. 5, where the active damping control containing the compensation function is in the dotted box in the figure.

Specifically, by linearizing $dI_{qref}$ and considering the steady state value $\Delta\theta_{pll0}$ of perturbated phase $\Delta\theta_{pll}$ measured by the phase lock loop is zero, the linearized result is:

$$\Delta dI_{qref} = I_{dref0} \times \Delta\theta_{pll} - \Delta\theta_{pll0} \times \Delta I_{dref} = I_{dref0} \times \Delta\theta_{pll},$$

Applying the $\Delta dI_{qref}$ to the position of $\Delta I_{qref}$ in the expression of $V_{t\_q}$, the expression of the third interaction energy function $dV_{t\_q}$ corresponding to the additional reactive power energy feedback channel is:

$$dV_{t\_q} = -I_{dref0} \int \Delta\theta_{pll} \Delta U_{iq} dt - R_p I_{dref0} \int \Delta\theta_{pll} \Delta I_{1q} dt$$

where $I_{dref0}$ is the current reference value $I_{dref}$ of the d-axis current inner loop in the stable state.

The sum of $dV_{t\_q}$ and $V_{t\_pll}$ is:

$$V_{t\_pll} + dV_{t\_q} = (k_2 - I_{dref0}) \int \Delta\theta_{pll} \Delta U_{iq} dt + R_p(k_2 - I_{dref}) \int \Delta\theta_{pll} \Delta I_{1q} dt$$

where $k_2 = I_{dref0}$, $I_{dref0} = I_{1d0}$, thus the sum of $V_{t\_pll}$ and $dV_{t\_q}$ is 0. It means the third interaction energy $dV_{t\_q}$ generated by the additional reactive power energy feedback channel can be offset by the second interaction energy generated by the PLL energy feedback channel. In detail, the third interaction energy $V_{t\_q}$ generated by the reactive power energy feedback channel is zero before adjusting, the third interaction energy $dV_{t\_q}$ is negative after adjusting. In other words, the reduction of the adjusted third interaction energy function value generated by the current reference value of the q-axis current inner loop which is generated by the reactive power outer loop control subsystem can be offset by the increment of the second interaction energy function value generated by the variation rate of perturbated phase of the phase lock loop when the oscillation occurs. On this basis, it can eliminate the adverse effect of the second interaction energy generated by the PLL energy feedback channel on the stored energy.

In summary, the features of the above different feedback energy terms are summarized as follows: 1) the q-axis component of dissipation energy $V_{q\_acc}$ (i.e., $-R_p \int \Delta I_{1q}^2 dt$) decreases progressively with time; 2) the sum of d-axis component of dissipation energy $V_{d\_acc}$ (i.e., $-R_p \int \Delta I_{1d}^2 dt$) and the first interaction energy $V_{t\_dc}$ corresponding to the active power energy feedback channel decreases progressively with time; 3) the sum of the second interaction energy $V_{t\_pll}$ corresponding to the PLL energy feedback channel and the third interaction energy $dV_{t\_q}$ corresponding to the additional reactive power energy feedback channel is 0. It can be seen that, the total feedback energy decreases progressively with time, thus the stored energy $V_{s\_acc}$ decreases progressively with time, and the active damping control of oscillations in a broad frequency band can be realized, that is, the oscillation in a broad frequency band is suppressed.

Based on the above analysis, when the oscillation occurs, adjust the current reference value of the q-axis current inner loop generated by the reactive power outer loop control subsystem according to the following compensation function.

$$dI_{qref} = -I_{dref} \times \omega_{pll} dt$$

Where $dI_{qref}$ is an adjusted current reference value of the q-axis current inner loop, $I_{dref}$ is the instantaneous current reference value of the d-axis current inner loop generated by the DC voltage control subsystem, $\omega_{pll}$ is the deviation of the angular frequency measured by phase lock loop, i.e., the deviation between the instantaneous angular frequency measured by phase lock loop and the rated angular frequency.

The mentioned deviation of the angular frequency measured by the phase lock loop and mentioned perturbated phase measured by the phase lock loop in the phase lock loop subsystem satisfy the following relationship.

$$\Delta\theta_{pll} = \int \omega_{pll} dt,$$

Where $\Delta\theta_{pll}$ is perturbated phase measured by the phase lock loop in the phase lock loop subsystem, $\omega_{pll}$ is the deviation of the angular frequency measured by the phase lock loop.

Based on the above relationship and compensation function, the reduction of the adjusted third interaction energy function value generated by the current reference value of the q-axis current inner loop which is generated by the reactive power outer loop control subsystem can be offset by the increment of the second interaction energy function value generated by variation rate of the perturbated phase in the phase lock loop when the oscillation occurs, to make the stored energy function value decrease with time, so as to suppress the oscillation.

The proposed active damping control method can suppress efficiently the oscillations in sub-synchronous frequency band (2.5-50 Hz) and sub-synchronous frequency band (50-100 Hz).

Another embodiment of present application proposes an oscillation active damping control system for grid-tied type-4 wind turbine generator. Since the system embodiments have the same working principle as the method embodiments above, the embodiment of the method above can be referred to for repetition and will not be described here.

Figure 6:
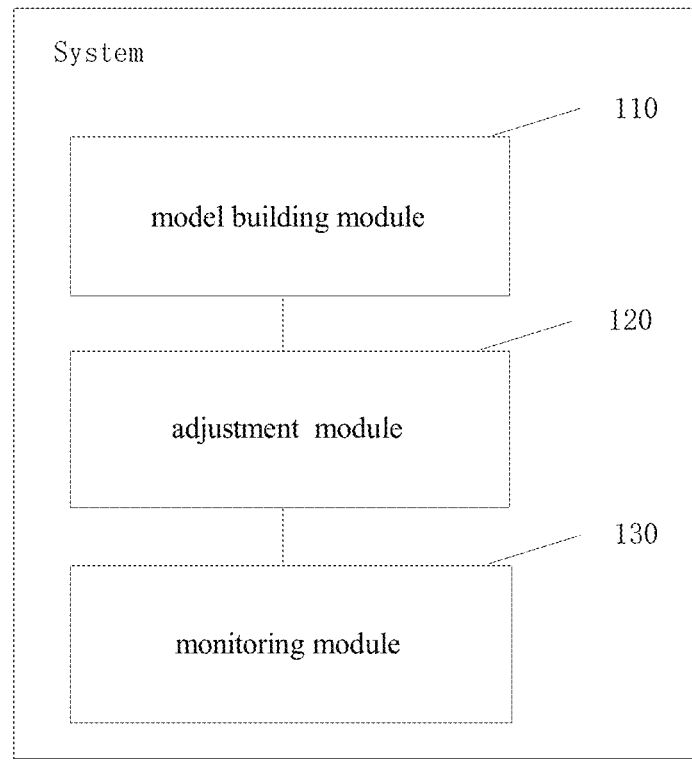
FIG. 6 is a schematic diagram of the oscillation active damping control system for grid-tied type-4 wind turbine generator according to an embodiment of the present application.

Specifically, as shown in FIG. 6, the oscillation active damping control system comprising:

a model building module 110 is configured to base on an interconnection model of multiple subsystems in grid-tied type-4 wind turbine generator, construct a stored energy function and a dissipated energy function of a current inner loop control subsystem of the multiple subsystems, and a first interaction energy function between the current inner loop control subsystem and a DC voltage control subsystem, a second interaction energy function between the current inner loop control subsystem and a phase-locked loop subsystem, and a third interaction energy function between the current inner loop control subsystem and a reactive power outer loop control subsystem. On this basis, establish an energy feedback model of the grid-tied type-4 wind turbine generator;

an adjustment module 120 is configured to obtain the instantaneous angular frequency measured by a phase lock loop in the phase-locked loop subsystem when the oscillation of the grid-tied type-4 wind turbine generator occurs, then based on the energy feedback model, adjust the current reference value of the q-axis current inner loop generated by the reactive power outer loop control subsystem, to make the stored energy function value decrease with time, so as to suppress the oscillation.

Further, the adjustment module is configured to adjust the current reference value of the q-axis current inner loop generated by the reactive power outer loop control subsystem according the following compensation function.

$$dI_{qref} = -I_{dref} \times \omega_{pll} dt,$$

Where $dI_{qref}$ is adjusted current reference value of the q-axis current inner loop, $I_{dref}$ is the instantaneous current reference value of the d-axis current inner loop generated by the DC voltage control subsystem, $\omega_{pll}$ is the deviation of the angular frequency measured by the phase lock loop, i.e., the deviation between the instantaneous angular frequency measured by the phase lock loop and the rated angular frequency.

In addition, the oscillation active damping control system comprises a monitoring module 130 configured to measure the angular frequency of the phase lock loop in real time.

The model building module is configured to construct energy functions based on an interconnection model of the multiple subsystems, a small signal model of d-axis of the current inner loop control subsystem and a small signal model of q-axis of the current inner loop control subsystem, wherein expression of the stored energy function is:

$$V_{s\_acc} = \frac{1}{2}L_1(\Delta I_{1d}^2 + \Delta I_{1q}^2) + \frac{1}{2}C_i(\Delta U_{id}^2 + \Delta U_{iq}^2),$$

Where $V_{s\_acc}$ is the stored energy function, $L_1$ is filter inductance in the current inner loop control subsystem, Mid is d-axis perturbated current in the filter inductance $L_1$, $\Delta I_{1q}$ is q-axis perturbated current in the filter inductance $L_1$, $$C_i = \frac{1}{k_i \times k_{pwm}},$$

$k_i$ is an integral gain of a PI controller in the current inner loop control subsystem, $k_{pwm}$ is gain of a converter, $\Delta U_{1d}$ is perturbated state variable in an integral link of a d-axis PI controller in the current inner loop control subsystem, $\Delta U_{1q}$ is perturbated state variable in an integral link of a q-axis PI controller in the current inner loop control subsystem.

The expression of the dissipation energy function is:

$$V_{d\_acc} = -R_p \int \Delta I_{1d}^2 dt - R_p \int \Delta I_{1q}^2 dt,$$

where $V_{d\_acc}$ is the dissipation energy function, $R_p = k_p \times k_{pwm}$, $k_p$ is the proportional gain of the PI controller in the current inner loop control subsystem, $k_{pwm}$ is the gain of the converter.

The expression of the first interaction energy function is:

$$V_{t\_dc} = \int \Delta I_{dref} \Delta U_{id} dt + \int \int \Delta I_{dref} \Delta I_{1d} dt$$

Where $V_{t\_dc}$ is the first interaction energy function, $\Delta I_{dref}$ is perturbated current reference value of the d-axis current inner loop generated by the DC voltage control subsystem.

The expression of the second interaction energy function is:

$$V_{t\_pll} = -k_1(\int \Delta\theta_{pll} \Delta U_{id} dt + R_p \int \Delta\theta_{pll} \Delta I_{1d} dt) + k_2 (\int \Delta\theta_{pll} \Delta U_{iq} dt + R_p \int \Delta\theta_{pll} \Delta I_{1q} dt) + k_3 \int \Delta\theta_{pll} \Delta I_{1d} dt + k_4 \int \Delta\theta_{pll} \Delta I_{1q} dt$$

Where $V_{t\_pll}$ is the second interaction energy function, $\Delta\theta_{pll}$ is perturbated phase of the phase lock loop in the phase lock loop subsystem, $k_1$, $k_2$, $k_3$, and $k_4$ are constants whose expressions are shown below:

$$\begin{cases} k_1 = -I_{1q0} \\ k_2 = I_{1d0} \\ k_3 = -U_{pwmq0} + U_{pccq0} + \omega_0 L_1 I_{1d0} \\ k_4 = U_{pwmd0} - U_{pccd0} + \omega_0 L_1 I_{1q0} \end{cases}$$

Where $I_{1d0}$ is a steady-state value of d-axis current in the filter inductance $L_1$, $I_{1q0}$ is a steady-state value of q-axis current in the filter inductance $L_1$, $U_{pwmd0}$ is a steady-state value of the d-axis component of converter port voltage in the current inner loop control subsystem, $U_{pwmq0}$ is a steady-state value of the q-axis component of the converter port voltage in the current inner loop control subsystem, $U_{pccd0}$ is a steady-state value of d-axis voltage at a point of common coupling, $U_{pccq0}$ is a steady-state value of q-axis voltage at the point of common coupling, and $\omega_0$ is rated angular frequency of the phase lock loop.

The expression of the third interaction energy function is:

$$V_{t\_q} = \int \Delta I_{qref} \Delta U_{iq} dt + \int R_p \Delta I_{qref} \Delta I_{1q} dt$$

Where $V_{t\_q}$ is the third interaction energy function, $\Delta I_{qref}$ is perturbated current reference value of the q-axis current inner loop generated by the reactive power outer loop control subsystem.

Wherein the small signal model of the d-axis of the current inner loop control subsystem is configured to be:

$$\begin{cases} C_i \dfrac{d\Delta U_{id}}{dt} = -\Delta I_{1d} + F_C \\ L_1 \dfrac{d\Delta I_{1d}}{dt} = -R_p \Delta I_{1d} + \Delta U_{id} + F_{Ld} \\ F_{Cd} = \Delta I_{dref} - k_1 \Delta\theta_{pll} \\ F_{Ld} = k_3 \Delta\theta + (\Delta I_{dref} - k_1 \Delta\theta_{pll}) \end{cases}$$

The small signal model of the q-axis of the current inner loop control subsystem is configured to be:

$$\begin{cases} C_i \dfrac{d\Delta U_{iq}}{dt} = -\Delta I_{1q} + F_{Cq} \\ L_1 \dfrac{d\Delta I_{1q}}{dt} = -R_p \Delta I_{1q} + \Delta U_{iq} + F_{Lq} \\ F_{Cq} = \Delta I_{qref} - k_2 \Delta\theta_{pll} \\ F_{Lq} = k_4 \Delta\theta_{pll} + R_p(\Delta I_{qref} + k_2 \Delta\theta_{pll}) \end{cases}$$

Wherein the energy feedback model is configured to be:

$$V_{s\_acc} = V_{d\_acc} + V_{t\_dc} + V_{t\_pll} + V_{t\_q}.$$

Wherein the energy feedback model is configured that the deviation of the angular frequency measured by the phase lock loop and perturbated phase of the phase lock loop in the phase lock loop subsystem satisfy the following relationship:

$$\Delta\theta_{pll} = \int \omega_{pll} dt$$

Where $\Delta\theta_{pll}$ is perturbated phase of the phase lock loop in the phase lock loop subsystem, $\omega_{pll}$ is the deviation of the angular frequency measured by the phase lock loop.

Based on the above relationship and the compensation function, the reduction of the third interaction energy function value generated by adjusted current reference value of the q-axis current inner loop which is generated by the reactive power outer loop control subsystem is offset by the increment of the second interaction energy function value that is induced by the perturbated phase of the phase lock loop when the oscillation occurs, to make the stored energy function value decreases with time, so as to suppress the oscillation.

Wherein the oscillation comprises oscillation in sub-synchronous frequency band, from 2.5 Hz to 50 Hz, or oscillation in super-synchronous frequency band, from 50 Hz to 100 Hz.

The beneficial effects of the oscillation active damping control method and system for grid-tied type-4 wind turbine generator proposed in the application are better illustrated by the following embodiment.

To verify the effectiveness and feasibility of the proposed method, the control program corresponding to the oscillation active damping control method for grid-tied type-4 wind turbine generator proposed in the application is embedded to the practical controller of a real 2.5 MW type-4 WTG (wind turbine generator). On this basis, a hardware-in-loop simulation platform is built by combining RTDS (real time digital simulator). By adjusting the short circuit ratio of power grid and converter control parameters, oscillations with frequency of around 34 Hz and around 60 Hz in dq coordinate system are excited respectively in the simulation system. And the effectiveness of the oscillation active damping control method for grid-tied type-4 wind turbine generator proposed in the application in suppressing oscillations within sub-synchronous frequency band (2.5 Hz-50 Hz)/super-synchronous frequency band (50 Hz-100 Hz) can be verified.

Figure 11:
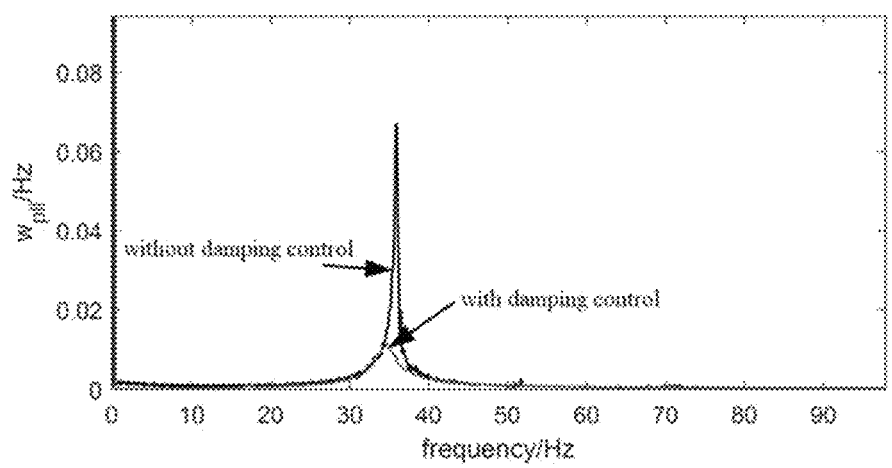
FIG. 11 is a schematic diagram of variation trajectory of total feedback energy obtained before and after the oscillation active damping control for oscillation with frequency of around 34 Hz in sub-synchronous frequency band according to an embodiment of the present application.

The First Embodiment: Effectiveness of the Oscillation in Sub-Synchronous Frequency Band Set the short circuit ratio of the power grid to be 1.8, increase the integral link of the PLL, and increase the active power of WTG progressively to around 1240 kW. After sub-synchronous oscillation of around 34 Hz occurs, switch on the active damping control. In this case, the waveform recordings of active power, angular frequency of the PLL, the output of damping link $dI_{qref}$ and the FFT analysis of PLL angular frequency are shown in FIG. 7-10. Meanwhile, collect the variation of state variables required for the calculation of feedback energy before and after the switching of damping control, and calculate the variation trajectory of energy using the trapezoidal integral algorithm. The variation trajectory of total feedback energy (that is, the stored energy) with time is shown in FIG. 11.

Figure 7:
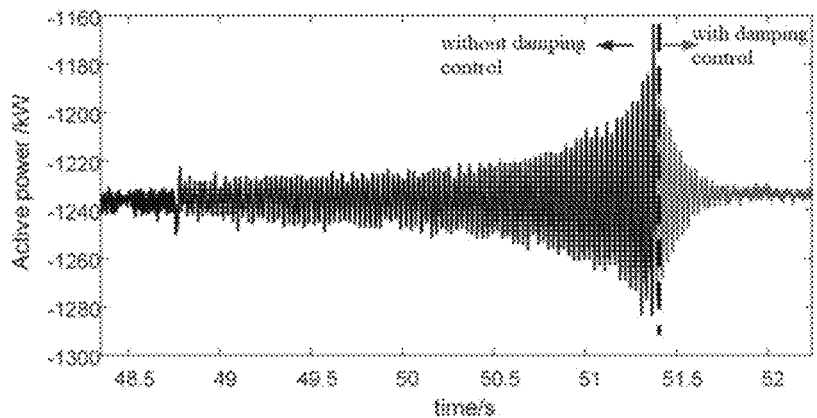
FIG. 7 shows wave recordings of active power obtained before and after the oscillation active damping control for oscillation with frequency of around 34 Hz in sub-synchronous frequency band according to an embodiment of the present application.
Figure 8:
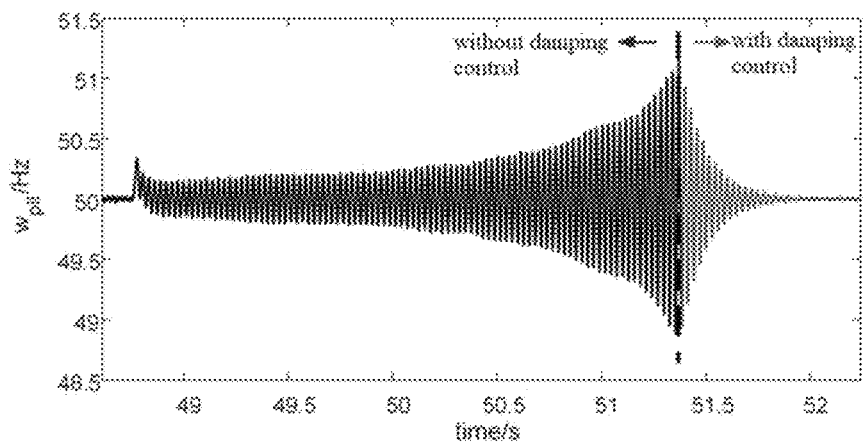
FIG. 8 shows wave recordings of angular frequency of phase lock loop obtained before and after the oscillation active damping control for oscillation with frequency of around 34 Hz in sub-synchronous frequency band according to an embodiment of the present application.
Figure 9:
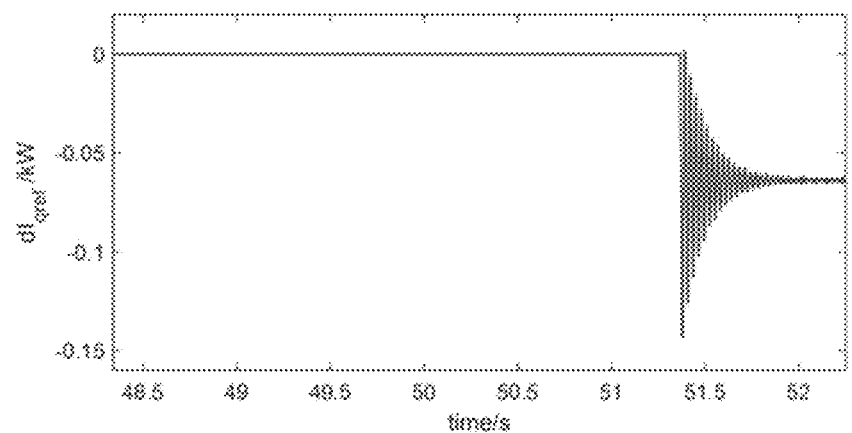
FIG. 9 shows wave recordings of damping link $dI_{qref}$ obtained before and after the oscillation active damping control for oscillation with frequency of around 34 Hz in sub-synchronous frequency band according to an embodiment of the present application.
Figure 10:
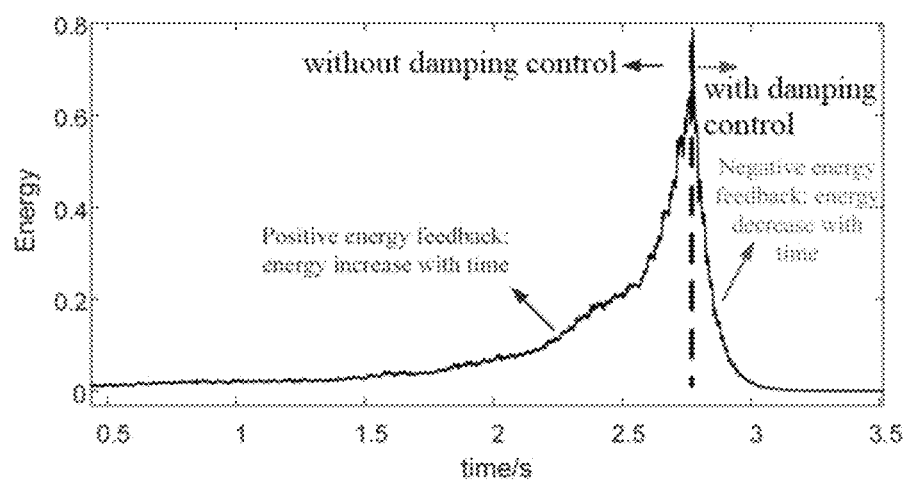
FIG. 10 shows the results of FFT analysis of angular frequency of the phase lock loop obtained before and after the oscillation active damping control for oscillation with frequency of around 34 Hz in sub-synchronous frequency band according to an embodiment of the present application.

According to FIGS. 7 and 8, the active damping control link is switched when the peak values of sub-synchronous oscillation components in the waveforms of active power and PLL frequency reach 65 kW and 1 Hz respectively. After the active damping control is switched on, the oscillation in sub-synchronous frequency band attenuates quickly, and the oscillation amplitude drops below 10% of the original value within 0.2 s. After the waveform being stabilized, there is no longer any sub-synchronous oscillation component. And FIG. 11 shows that, the total feedback energy before the switching of active damping control exhibits positive feedback characteristics (i.e., increases progressively), thus the oscillation diverges. After the active damping control is switched on, the total feedback energy exhibits negative feedback characteristics (i.e., decreases progressively), thus the oscillation is suppressed and converges. The experimental results above are consistent with the theoretical analysis results based on energy, and verify that the active damping control method proposed in the application has a good suppression effectiveness on the oscillation in the sub-synchronous frequency band.

Figure 16:
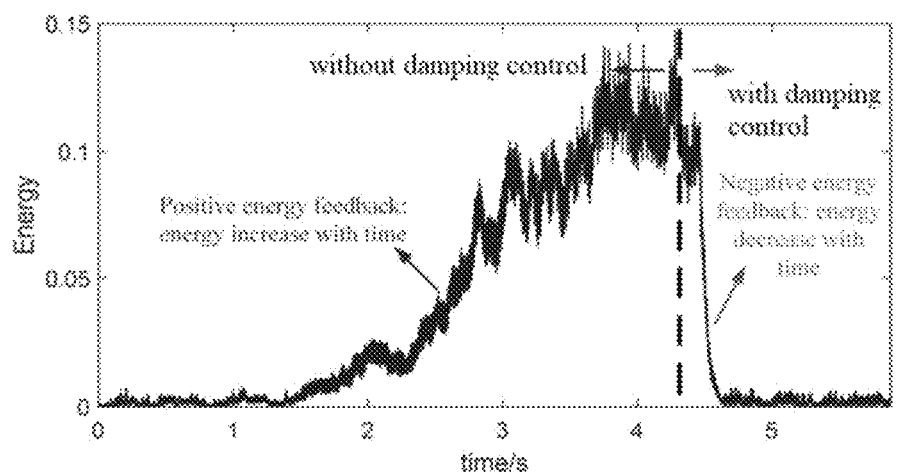
FIG. 16 is a schematic diagram of variation trajectory of total feedback energy obtained before and after the oscillation active damping control for oscillation with frequency of around 60 Hz in super-synchronous frequency band according to an embodiment of the present application.

The Second Embodiment: Effectiveness of the Oscillation in Super-Synchronous Frequency Band Set the short circuit ratio of the power grid to be 1.6, increase the bandwidths of the PLL and DC voltage outer control loop, and increase the active power of WTG progressively to around 550 kW. After super-synchronous oscillation of around 60 Hz occurs, switch on the active damping control. In this case, the wave recordings of active power, angular frequency of the PLL, the output of damping link dq, and the FFT analysis of PLL angular frequency are shown in FIG. 12-15. The variation trajectory of total feedback energy with time before and after the switching of the active damping control is shown in FIG. 16.

Figure 12:
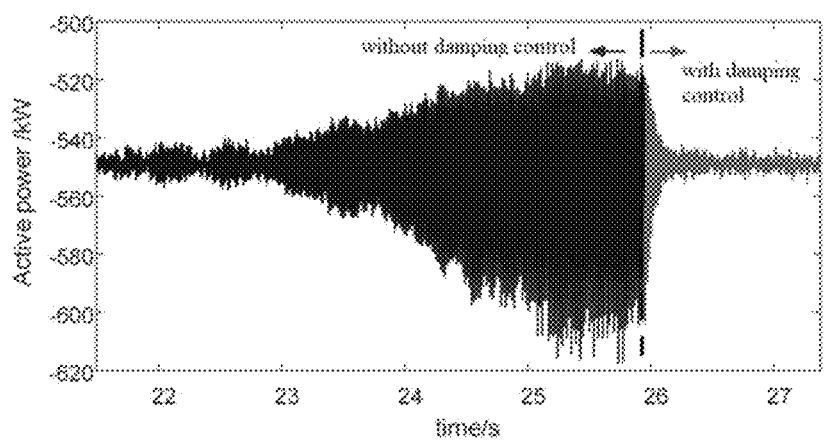
FIG. 12 shows wave recordings of active power obtained before and after the oscillation active damping control for oscillation with frequency of around 60 Hz in super-synchronous frequency band according to an embodiment of the present application.
Figure 13:
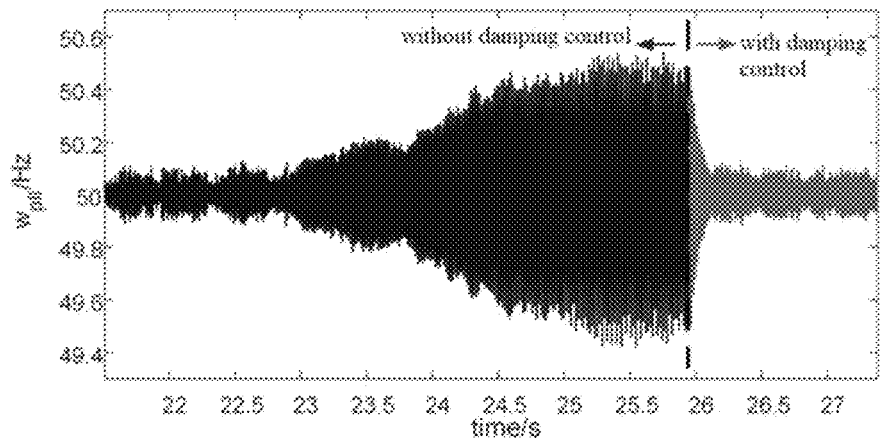
FIG. 13 shows wave recordings of angular frequency of the phase lock loop obtained before and after the oscillation active damping control for oscillation with frequency of around 60 Hz in super-synchronous frequency band according to an embodiment of the present application.
Figure 14:
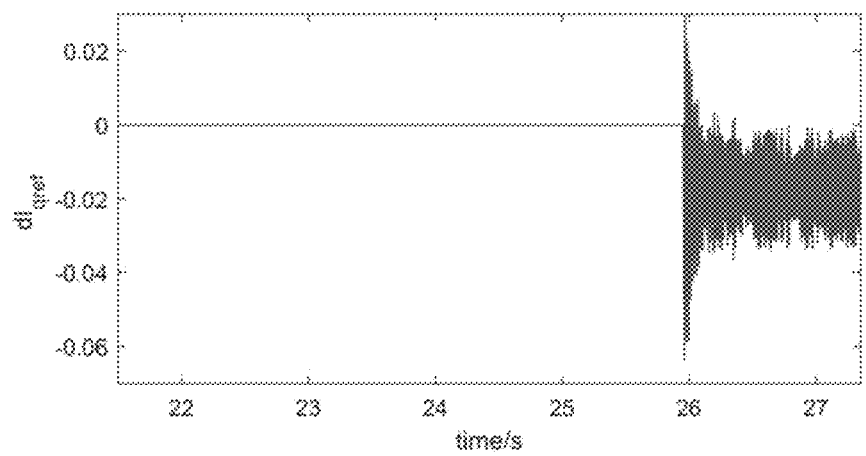
FIG. 14 shows wave recordings of damping link $dI_{qref}$ obtained before and after the oscillation active damping control for oscillation with frequency of around 60 Hz in super-synchronous frequency band according to an embodiment of the present application.
Figure 15:
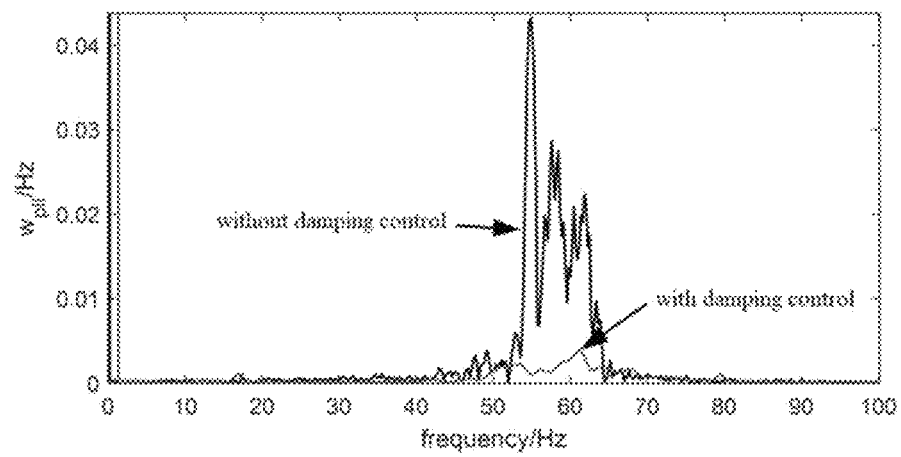
FIG. 15 shows the results of FFT analysis of angular frequency of the phase lock loop obtained before and after the oscillation active damping control for oscillation with frequency of around 60 Hz in super-synchronous frequency band according to an embodiment of the present application.

It can be seen from FIGS. 12 and 13 that, the active damping control link is switched when the peak values of super-synchronous oscillation components in the waveforms of active power and PLL frequency reach 60 kW and 0.5 Hz respectively. After the active damping control is switched on, the oscillation in super-synchronous frequency band attenuates quickly, and the oscillation amplitude drops below 10% of the original value within 0.1 is. After the waveform being stabilized, there is no longer any super-synchronous oscillation component. FIG. 16 shows that, the total feedback energy before the switching of active damping control exhibits positive feedback characteristics (i.e., increases progressively), thus the oscillation diverges. After the active damping control is switched on, the total feedback energy exhibits negative feedback characteristics (i.e., decreases progressively), thus the oscillation is suppressed and converges. The experimental results above are consistent with the theoretical analysis results based on energy, and verify that the active damping control method proposed in the application has a good suppression effectiveness on the oscillation in the super-synchronous frequency band.

Compared with prior arts, the proposed oscillation active damping control method and system for grid-tied type-4 wind turbine generator are proposed in an embodiment of the application. On one hand, based on the stored energy and dissipated energy of the current inner loop control subsystem, and the interaction energies between the current inner loop control subsystem and other subsystems, an energy feedback model is constructed. Adjusting the current reference value of the q-axis current inner loop by measuring angular frequency of the PLL in real time, makes the stored energy decrease progressively with time, so as to suppress the oscillation. By adjusting the variation rate of the stored energy being made negative, this method ensures the oscillation amplitude of the wind turbine generator show an attenuation trend, no matter how the oscillation frequency changes in the sub-synchronous frequency band and super-synchronous frequency band, so as to effectively suppress oscillation. On the other hand, the oscillation active damping control method and system for grid-tied type-4 wind turbine generator are proposed in an embodiment of the application, when the oscillation frequency of the wind turbine generator changes, the angular frequency measured by the phase lock loop changes correspondingly, by monitoring the angular frequency of the phase lock loop in real time, the instantaneous deviation between the instantaneous angular frequency measured by the phase lock loop and the rated angular frequency is obtained. And the current reference value of the q-axis current inner loop is adjusted by this deviation, so the oscillation of the wind turbine generator can be suppressed automatically, this method is not only easy to implement but also is effective.

It can be understood by those skilled in the art that the whole or part of the process of realizing the above embodiment method can be completed by instructing the relevant hardware through a computer program, and the program can be stored in a computer-readable storage medium. The computer-readable storage medium is a disk, an optical disk, a read-only memory or a random storage memory, etc.

The above are only preferred specific embodiments of the present application, but the scope of protection of the present application is not limited to this, any person skilled in the art can easily think of changes or replacement changes within the technical scope disclosed by the present application should be covered within the protection scope of the present application.

What is claimed is:

1. An oscillation active damping control method for grid-tied type-4 wind turbine generator, the grid-tied type-4 wind turbine generator comprises multiple subsystems, wherein the method comprising:

based on an interconnection model of the multiple subsystems, constructing a stored energy function and a dissipated energy function of a current inner loop control subsystem, and a first interaction energy function between the current inner loop control subsystem and a DC voltage control subsystem, a second interaction energy function between the current inner loop control subsystem and a phase lock loop subsystem, and a third interaction energy function between the current inner loop control subsystem and a reactive power outer loop control subsystem, then establishing an energy feedback model of the grid-tied type-4 wind turbine generator;

when oscillation of the grid-tied type-4 wind turbine generator occurs, obtaining instantaneous angular frequency of a phase lock loop in the phase lock loop subsystem, based on the energy feedback model, adjusting a current reference value of a q-axis current inner loop generated by the reactive power outer loop control subsystem, to make the stored energy function value decrease with time, so as to suppress the oscillation.

2. The oscillation active damping control method for grid-tied type-4 wind turbine generator according to the claim 1, wherein constructing energy functions based on an interconnection model of the multiple subsystems, a small signal model of d-axis of the current inner loop control subsystem and a small signal model of q-axis of the current inner loop control subsystem;

the expression of the stored energy function is:

$$V_{s\_acc} = \frac{1}{2}L_1(\Delta I_{1d}^2 + \Delta I_{1q}^2) + \frac{1}{2}C_i(\Delta U_{id}^2 + \Delta U_{iq}^2)$$

where $V_{s\_acc}$ is the stored energy function, $L_1$ is filter inductance in the current inner loop control subsystem, $\Delta I_{1d}$ is d-axis perturbated current in the filter inductance $L_1$, $\Delta I_{1q}$ is q-axis perturbated current in the filter inductance $L_1$, $$C_i = \frac{1}{k_i \times k_{pwm}},$$

$k_i$ is an integral gain of a PI controller in the current inner loop control subsystem, $k_{pwm}$ is gain of a converter, $\Delta U_{1d}$ is perturbated state variable in an integral link of a d-axis PI controller in the current inner loop control subsystem, $\Delta U_{1q}$ is perturbated state variable in an integral link of a q-axis PI controller in the current inner loop control subsystem;

the expression of the dissipation energy function is:

$$V_{d\_acc} = -R_p \int \Delta I_{1d}^2 dt - R_p \int \Delta I_{1q}^2 dt,$$

where $V_{d\_acc}$ is the dissipation energy function, $R_p = k_p \Delta k_{pwm}$, $k_p$ is the proportional gain of, the PI controller in the current inner loop control subsystem, $k_{pwm}$ is the gain of the converter;

the expression of the first interaction energy function is:

$$V_{t\_dc} = \int \Delta I_{dref} \Delta U_{id} dt + \int \Delta I_{dref} \Delta I_{1d} dt,$$

where $V_{t\_dc}$ is the first interaction energy function, $\Delta I_{dref}$ is perturbated current reference value of the d-axis current inner loop generated by the DC voltage control subsystem;

the expression of the second interaction energy function is:

$$V_{t\_pll} = -k_1(\int \Delta \theta_{pll} \Delta U_{id} dt + R_p \int \Delta I_{1d} dt) + k_2(\int \Delta \theta_{pll} \Delta U_{iq} dt + R_p \int \Delta \theta_{pll} \Delta I_{1q} dt) + k_3 \int \Delta \theta_{pll} \Delta I_{1d} dt + k_4 \int \Delta \theta_{pll} \Delta_{1q} dt,$$

where $V_{t\_pll}$ is the second interaction energy function, $\Delta \theta_{pll}$ is perturbated phase of the phase lock loop in the phase lock loop subsystem, $k_1$, $k_2$, $k_3$, and $k_4$ are constants whose expressions are shown below:

$$\begin{cases} k_1 = -I_{1q0} \\ k_2 = I_{1d0} \\ k_3 = -U_{pwmq0} + U_{pccq0} + \omega_0 L_1 I_{1d0} \\ k_4 = U_{pwmd0} - U_{pccd0} + \omega_0 L_1 I_{1q0} \end{cases},$$

where $I_{1d0}$ is a steady-state value of d-axis current in the filter inductance $L_1$, $I_{1q0}$ is a steady-state value of q-axis current in the filter inductance $L_1$, $U_{pwmd0}$ is a steady-state value of the d-axis component of converter port voltage in the current inner loop control subsystem, $U_{pwmq0}$ is a steady-state value of the q-axis component of the converter port voltage in the current inner loop control subsystem, $U_{pccd0}$ is a steady-state value of d-axis voltage at a point of common coupling, $U_{pccq0}$ is a steady-state value of q-axis voltage at the point of common coupling, and $\omega_0$ is rated angular frequency of the phase lock loop;

the expression of the third interaction energy function is:

$$V_{t\_q} = \int \Delta I_{qref} \Delta U_{iq} dt + \int R_p \Delta I_{qref} \Delta I_{1q} dt,$$

where $V_{t\_q}$ is the third interaction energy function, $\Delta I_{qref}$ is perturbated current reference value of the q-axis current inner loop generated by the reactive power outer loop control subsystem.

3. The oscillation active damping control method for grid-tied type-4 wind turbine generator according to claim 2, wherein the small signal model of the d-axis of the current inner loop control subsystem is:

$$\begin{cases} C_i \dfrac{d\Delta U_{id}}{dt} = -\Delta I_{1d} + F_{Cd} \\ L_1 \dfrac{d\Delta I_{1d}}{dt} = -R_p \Delta I_{1d} + \Delta U_{id} + F_{Ld} \\ F_{Cd} = \Delta I_{dref} - k_1 \Delta \theta_{pll} \\ F_{Ld} = k_3 \Delta \theta + (\Delta I_{dref} - k_1 \Delta \theta_{pll}) \end{cases}$$

the small signal model of the q-axis of the current inner loop control subsystem is:

$$\begin{cases} C_i \dfrac{d\Delta U_{iq}}{dt} = -\Delta I_{1q} + F_{Cq} \\ L_1 \dfrac{d\Delta I_{1q}}{dt} = -R_p \Delta I_{1q} + \Delta U_{iq} + F_{Lq} \\ F_{Cq} = \Delta I_{qref} - k_2 \Delta \theta_{pll} \\ F_{Lq} = k_4 \Delta \theta_{pll} + R_p(\Delta I_{qref} + k_2 \Delta \theta_{pll}) \end{cases}.$$

4. The oscillation active damping control method for grid-tied type-4 wind turbine generator according to claim 2, wherein the energy feedback model is:

$$V_{s\_acc} = V_{d\_acc} + V_{t\_dc} + V_{t\_pll} + V_{t\_q}.$$

5. The oscillation active damping control method for grid-tied type-4 wind turbine generator according to claim 1, wherein adjusting the current reference value of the q-axis current inner loop generated by the reactive power outer loop control subsystem according to the following compensation function:

$$dI_{qref} = -I_{dref} \times \int \omega_{pll} dt,$$

where $dI_{qref}$ is adjusted current reference value of the q-axis current inner loop, $I_{dref}$ is instantaneous current reference value of the d-axis current inner loop generated by the DC voltage control subsystem, $\omega_{pll}$ is deviation of the angular frequency measured by the phase lock loop, that is, the deviation between the instantaneous angular frequency measured by phase lock loop and the rated angular frequency.

6. The oscillation active damping control method for grid-tied type-4 wind turbine generator according to claim 5, wherein the deviation of the angular frequency measured by the phase lock loop and perturbated phase of the phase lock loop in the phase lock loop subsystem satisfy the following relationship:

$$\Delta \theta_{pll} = \int \omega_{pll} dt,$$

where $\Delta \theta_{pll}$ is perturbated phase of the phase lock loop in the phase lock loop subsystem, $\omega_{pll}$ is the deviation of the angular frequency measured by the phase lock loop; based on the above relationship and the compensation function, the reduction of the third interaction energy function value generated by adjusted current reference value of the q-axis current inner loop which is generated by the reactive power outer loop control subsystem is offset by the increment of the second interaction energy function value that is induced by the perturbated phase of the phase lock loop when the oscillation occurs, to make the stored energy function value decreases with time, so as to suppress the oscillation.

7. The oscillation active damping control method for grid-tied type-4 wind turbine generator according to claim 5, wherein the oscillation comprises oscillation in sub-synchronous frequency band, from 2.5 Hz to 50 Hz, or oscillation in super-synchronous frequency band, from 50 Hz to 100 Hz.

8. An oscillation active damping control system for grid-tied type-4 wind turbine generator, comprising:
a model building module is configured to base on an interconnection model of multiple subsystems for the grid-tied type-4 wind turbine generator, construct a stored energy function and a dissipated energy function of the current inner loop control subsystem in the multiple subsystems, and a first interaction energy function between the current inner loop control subsystem and a DC voltage control subsystem, a second interaction energy function between the current inner loop control subsystem and a phase-locked loop subsystem, and a third interaction energy function between the current inner loop control subsystem and a reactive power outer loop control subsystem, then establish an energy feedback model;
an adjustment module is configured to obtain the instantaneous angular frequency of a phase lock loop in the phase-locked loop subsystem when the oscillation of the grid-tied type-4 wind turbine generator occurs, based on the energy feedback model, adjust a current reference value of a q-axis current inner loop generated by the reactive power outer loop control subsystem, to make the value of the stored energy function decrease with time, so as to suppress the oscillation.

9. The oscillation active damping control system for grid-tied type-4 wind turbine generator according to claim 8, wherein the adjustment module is configured to adjust a current reference value of a q-axis current inner loop generated by the reactive power outer loop control subsystem based on the following compensation function:

$$dI_{qref} = -I_{dref} \times \int \omega_{pll} dt,$$

where $dI_{qref}$ is adjusted current reference value of the q-axis current inner loop, $I_{dref}$ is instantaneous current reference value of a d-axis current inner loop generated by the DC voltage control subsystem, $\omega_{pll}$ is deviation of angular frequency measured by the phase lock loop, that is, the deviation between the instantaneous angular frequency measured by the phase lock loop and rated angular frequency.

10. The oscillation active damping control system for grid-tied type-4 wind turbine generator according to claim 9, wherein the oscillation active damping control system comprises a monitoring module is configured to measure the angular frequency of the phase lock loop in real time.

11. The oscillation active damping control system for grid-tied type-4 wind turbine generator according to claim 9, wherein the energy feedback model is configured that the deviation of the angular frequency measured by the phase lock loop and perturbated phase of the phase lock loop in the phase lock loop subsystem satisfy the following relationship:

$$\Delta \theta_{pll} = \int \omega_{pll} dt,$$

where $\Delta \theta_{pll}$ is perturbated phase of the phase lock loop in the phase lock loop subsystem, $\omega_{pll}$ is the deviation of the angular frequency measured by the phase lock loop; based on the above relationship and the compensation function, the reduction of the third interaction energy function value generated by adjusted current reference value of the q-axis current inner loop which is generated by the reactive power outer loop control subsystem is offset by the increment of the second interaction energy function value that is induced by the perturbated phase of the phase lock loop when the oscillation occurs, to make the stored energy function value decreases with time, so as to suppress the oscillation.

12. The oscillation active damping control method for grid-tied type-4 wind turbine generator according to claim 11, wherein the oscillation comprises oscillation in sub-synchronous frequency band, from 2.5 Hz to 50 Hz, or oscillation in super-synchronous frequency band, from 50 Hz to 100 Hz.

13. The oscillation active damping control system for grid-tied type-4 wind turbine generator according to claim 8, the model building module is configured to construct energy functions based on an interconnection model of the multiple subsystems, a small signal model of d-axis of the current inner loop control subsystem and a small signal model of q-axis of the current inner loop control subsystem, wherein expression of the stored energy function is:

$$V_{s\_acc} = \frac{1}{2}L_1(\Delta I_{1d}^2 + \Delta I_{1q}^2) + \frac{1}{2}C_i(\Delta U_{id}^2 + \Delta U_{iq}^2)$$

where $V_{s\_acc}$ is the stored energy function, $L_1$ is filter inductance in the current inner loop control subsystem, $\Delta I_{1d}$ is d-axis perturbated current in the filter inductance $L_1$, $\Delta I_{1q}$ is q-axis perturbated current in the filter inductance $L_1$, $$C_i = \frac{1}{k_i \times k_{pwm}},$$

$k_i$ is an integral gain of a PI controller in the current inner loop control subsystem, $k_{pwm}$ is gain of a converter, $\Delta U_{1d}$ is perturbated state variable in an integral link of a d-axis PI controller in the current inner loop control subsystem, $\Delta U_{1q}$ is perturbated state variable in an integral link of a q-axis PI controller in the current inner loop control subsystem;

the expression of the dissipation energy function is:

$$V_{d\_acc} = -R_p \int \Delta I_{1d}^2 dt - R_p \int \Delta I_{1q}^2 dt,$$

where $V_{d\_acc}$ is the dissipation energy function, $R_p = k_p \times k_{pwm}$, $k_p$ is the proportional gain of the PI controller in the current inner loop control subsystem, $k_{pwm}$ is the gain of the converter;

the expression of the first interaction energy function is:

$$V_{t\_dc} = \int \Delta I_{dref} \Delta U_{id} dt + \int \Delta I_{dref} \Delta I_{1d} dt,$$

where $V_{t\_dc}$ is the first interaction energy function, $\Delta I_{dref}$ is perturbated current reference value of the d-axis current inner loop generated by the DC voltage control subsystem;

the expression of the second interaction energy function is:

$$V_{t\_pll} = -k_1(\int \Delta\theta_{pll}\Delta U_{id}dt + R_p\int\Delta I_{1d}dt) + k_2(\int\Delta\theta_{pll}\Delta U_{iq}dt + R_p\int\Delta\theta_{pll}\Delta I_{1q}dt) + k_3\int\Delta\theta_{pll}\Delta I_{1d}dt + k_4\int\Delta\theta_{pll}\Delta I_{1q}dt,$$

where $V_{t\_pll}$ is the second interaction energy function, $\Delta\theta_{pll}$ it is perturbated phase of the phase lock loop in the phase lock loop subsystem, $k_1$, $k_2$, $k_3$, and $k_4$ are constants whose expressions are shown below:

$$\begin{cases} k_1 = -I_{1q0} \\ k_2 = I_{1d0} \\ k_3 = -U_{pwmq0} + U_{pccq0} + \omega_0 L_1 I_{1d0} \\ k_4 = U_{pwmd0} - U_{pccd0} + \omega_0 L_1 I_{1q0} \end{cases},$$

where $I_{1d0}$ is a steady-state value of d-axis current in the filter inductance $L_1$, $I_{1q0}$ is a steady-state value of q-axis current in the filter inductance $L_1$, $U_{pwmd0}$ is a steady-state value of the d-axis component of converter port voltage in the current inner loop control subsystem, $U_{pwmq0}$ is a steady-state value of the q-axis component of the converter port voltage in the current inner loop control subsystem, $U_{pccd0}$ is a steady-state value of d-axis voltage at a point of common coupling, $U_{pccq0}$ is a steady-state value of q-axis voltage at the point of common coupling, and $\omega_0$ is rated angular frequency of the phase lock loop;

the expression of the third interaction energy function is:

$$V_{t\_q} = \int \Delta I_{qref} \Delta U_{iq} dt + \int R_p \Delta I_{qref} \Delta I_{1q} dt,$$

where $V_{t\_q}$ is the third interaction energy function, $\Delta I_{qref}$ is perturbated current reference value of the q-axis current inner loop generated by the reactive power outer loop control subsystem.

14. The oscillation active damping control system for grid-tied type-4 wind turbine generator according to claim 13, wherein the small signal model of the d-axis of the current inner loop control subsystem is configured to be:

$$\begin{cases} C_i \dfrac{d\Delta U_{iq}}{dt} = -\Delta I_{1d} + F_{Cd} \\ L_1 \dfrac{d\Delta I_{1d}}{dt} = -R_p\Delta I_{1d} + \Delta U_{id} + F_{Ld} \\ F_{Cd} = \Delta I_{dref} - k_1\Delta\theta_{pll} \\ F_{Ld} = k_3\Delta\theta + (\Delta I_{dref} - k_1\Delta\theta_{pll}) \end{cases},$$

the small signal model of the q-axis of the current inner loop control subsystem is configured to be:

$$\begin{cases} C_i \dfrac{d\Delta U_{iq}}{dt} = -\Delta I_{1q} + F_{Cq} \\ L_1 \dfrac{d\Delta I_{1q}}{dt} = -R_p\Delta I_{1q} + \Delta U_{iq} + F_{Lq} \\ F_{Cq} = \Delta I_{qref} - k_2\Delta\theta_{pll} \\ F_{Lq} = k_4\Delta\theta_{pll} + R_p(\Delta I_{qref} + k_2\Delta\theta_{pll}) \end{cases}.$$

15. The oscillation active damping control system for grid-tied type-4 wind turbine generator according to claim 13, wherein the energy feedback model is configured to be:

$$V_{s\_acc} = V_{d\_acc} + V_{t\_dc} + V_{t\_pll} + V_{t\_q}.$$

* * * * *